(12) United States Patent
Goradia

(10) Patent No.: US 10,805,340 B1
(45) Date of Patent: Oct. 13, 2020

(54) INFECTION VECTOR AND MALWARE TRACKING WITH AN INTERACTIVE USER DISPLAY

(71) Applicant: FireEye, Inc., Milpitas, CA (US)

(72) Inventor: Harnish Goradia, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 60 days.

(21) Appl. No.: 14/316,716

(22) Filed: Jun. 26, 2014

(51) Int. Cl.
*H04L 29/06* (2006.01)

(52) U.S. Cl.
CPC ................. *H04L 63/145* (2013.01)

(58) Field of Classification Search
CPC ..................................... H04L 63/145
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,278,901 A | 1/1994 | Shieh et al. |
| 5,319,776 A | 6/1994 | Hile et al. |
| 5,440,723 A | 8/1995 | Arnold et al. |
| 5,452,442 A | 9/1995 | Kephart |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,889,973 A | 3/1999 | Moyer |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |

(Continued)

FOREIGN PATENT DOCUMENTS

| | | |
|---|---|---|
| GB | 2439806 | 1/2008 |
| GB | 2490431 A | 10/2012 |

(Continued)

OTHER PUBLICATIONS

Hideshima et al., "STARMINE: A Visualization System for Cyber Attacks." Australian Computer Society, Inc., Jan. 2006, Asian-Pacific Symposium on Information Visualization (APVIS 2006), pp. 1-9.*

(Continued)

*Primary Examiner* — John B King
(74) *Attorney, Agent, or Firm* — Rutan & Tucker, LLP

(57) ABSTRACT

According to one embodiment, a computerized method comprises detecting a malicious attack on an enterprise network, where the enterprise network comprises a plurality of network devices. Upon detection of a malicious attack, information (metadata) associated with the malicious attack is gathered. Examples of the information may include at least a geographic location associated with each of the plurality of network devices. Thereafter, an interactive display of a propagation of malware associated the malicious attack is generated. The interactive display includes a plurality of display items representative of the plurality of network devices, each of the plurality of display items is selectable to provide information as to at least one of (i) an origin of the malware, (ii) an entry point of the malware into an enterprise network, or (iii) a targeted destination of the malware.

27 Claims, 13 Drawing Sheets

(56) References Cited

U.S. PATENT DOCUMENTS

| | | | |
|---|---|---|---|
| 6,088,804 A * | 7/2000 | Hill | G06F 21/552 |
| | | | 726/25 |
| 6,092,194 A | 7/2000 | Touboul | |
| 6,094,677 A | 7/2000 | Capek et al. | |
| 6,108,799 A | 8/2000 | Boulay et al. | |
| 6,118,382 A | 9/2000 | Hibbs et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack | |
| 6,357,008 B1 | 3/2002 | Nachenberg | |
| 6,417,774 B1 | 7/2002 | Hibbs et al. | |
| 6,424,627 B1 | 7/2002 | Sorhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,700,497 B2 | 3/2004 | Hibbs et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry et al. | |
| 6,971,097 B1 | 11/2005 | Wallman | |
| 6,981,279 B1 | 12/2005 | Arnold et al. | |
| 6,995,665 B2 | 2/2006 | Appelt et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,096,498 B2 * | 8/2006 | Judge | H04L 63/1416 |
| | | | 726/22 |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,213,260 B2 | 5/2007 | Judge | |
| 7,231,667 B2 | 6/2007 | Jordan | |
| 7,237,008 B1 | 6/2007 | Tarbotton et al. | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,325,251 B1 * | 1/2008 | Szor | H04L 63/145 |
| | | | 713/165 |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 * | 7/2009 | Szor | G06F 21/564 |
| | | | 726/22 |
| 7,584,455 B2 | 9/2009 | Ball | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,693,947 B2 * | 4/2010 | Judge | H04L 41/12 |
| | | | 709/206 |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 | 6/2010 | Nachenberg et al. | |
| 7,743,419 B1 * | 6/2010 | Mashevsky | G06F 21/552 |
| | | | 713/187 |
| 7,779,463 B2 | 8/2010 | Stolfo et al. | |
| 7,784,097 B1 | 8/2010 | Stolfo et al. | |
| 7,818,800 B1 | 10/2010 | Lemley, III et al. | |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,387 B2 | 5/2011 | Frazier et al. | |
| 7,937,761 B1 | 5/2011 | Benett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |

(56) References Cited

U.S. PATENT DOCUMENTS

| | | |
|---|---|---|
| 8,402,529 B1 | 3/2013 | Green et al. |
| 8,464,340 B2 | 6/2013 | Ahn et al. |
| 8,468,604 B2 | 6/2013 | Claudatos et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dahdia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,695,097 B1 | 4/2014 | Mathes et al. |
| 8,707,437 B1 | 4/2014 | Ming-Chang et al. |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,769,692 B1 | 7/2014 | Muttik et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,869,144 B2 | 10/2014 | Pratt et al. |
| 8,879,558 B1 | 11/2014 | Rijsman |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,959,428 B2 | 2/2015 | Majidian |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,009,834 B1 | 4/2015 | Ren et al. |
| 9,015,814 B1 | 4/2015 | Zakorzhevsky et al. |
| 9,027,135 B1 | 5/2015 | Aziz |
| 9,071,638 B1 | 6/2015 | Aziz et al. |
| 9,092,625 B1 | 7/2015 | Kashyap et al. |
| 9,104,814 B1 | 8/2015 | Mompoint et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,165,142 B1 | 10/2015 | Sanders et al. |
| 9,171,157 B2 | 10/2015 | Flores et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,210,185 B1 * | 12/2015 | Pinney Wood ... G06F 17/30958 |
| 9,223,972 B1 | 12/2015 | Vincent et al. |
| 9,225,695 B1 * | 12/2015 | Riera ................. H04L 9/0861 |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,246 B1 | 5/2016 | Wan et al. |
| 9,355,247 B1 | 5/2016 | Thioux et al. |
| 9,356,941 B1 * | 5/2016 | Kislyuk ................ H04L 63/14 |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,773,240 B1 | 9/2017 | McCauley |
| 9,781,144 B1 | 10/2017 | Otvagin et al. |
| 9,787,700 B1 | 10/2017 | Amin et al. |
| 9,787,706 B1 | 10/2017 | Otvagin et al. |

(56) References Cited

U.S. PATENT DOCUMENTS

| | | |
|---|---|---|
| 9,792,196 B1 | 10/2017 | Ismael et al. |
| 9,804,948 B2 | 10/2017 | Kolberg et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,860 B1 | 3/2018 | Banga et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,265,627 B2 | 4/2019 | Ghanchi |
| 10,366,231 B1 | 7/2019 | Singh et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0054068 A1 | 5/2002 | Ellis et al. |
| 2002/0056103 A1 | 5/2002 | Gong |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1* | 12/2002 | Halperin ............ H04L 63/1416 726/24 |
| 2003/0021728 A1 | 1/2003 | Sharpe et al. |
| 2003/0051168 A1* | 3/2003 | King ................. G06F 1/183 726/4 |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | Van Der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083372 A1* | 4/2004 | Williamson .......... G06F 21/566 713/188 |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0111632 A1* | 6/2004 | Halperin ............ H04L 63/145 726/24 |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0199569 A1 | 10/2004 | Kalkunte et al. |
| 2004/0199792 A1* | 10/2004 | Tan ................ H04L 43/00 726/12 |
| 2004/0205374 A1* | 10/2004 | Poletto ............... H04L 63/1425 714/4.2 |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0261030 A1* | 12/2004 | Nazzal ............... H04L 63/14 715/738 |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0022018 A1 | 1/2005 | Szor |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0157662 A1 | 6/2005 | Bingham et al. |
| 2005/0149726 A1 | 7/2005 | Joshi et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |

(56) References Cited

U.S. PATENT DOCUMENTS

| | | |
|---|---|---|
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0064721 A1 | 3/2006 | Del Val et al. |
| 2006/0070130 A1* | 3/2006 | Costea ............... G06F 21/552 726/24 |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0129382 A1 | 6/2006 | Anand et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0190561 A1 | 8/2006 | Conboy et al. |
| 2006/0191010 A1 | 8/2006 | Benjamin |
| 2006/0200863 A1* | 9/2006 | Ray ..................... G06F 12/145 726/24 |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0253906 A1 | 11/2006 | Rubin et al. |
| 2006/0288415 A1* | 12/2006 | Wong .................. H04L 63/1425 726/24 |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0169195 A1 | 7/2007 | Anand et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240215 A1 | 10/2007 | Flores et al. |
| 2007/0240217 A1 | 10/2007 | Tuvell et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0163356 A1 | 7/2008 | Won-Jip et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313734 A1* | 12/2008 | Rozenberg ............ G06N 5/043 726/22 |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013405 A1 | 1/2009 | Schipka |
| 2009/0013408 A1 | 1/2009 | Schipka |
| 2009/0031423 A1 | 1/2009 | Liu et al. |
| 2009/0036111 A1 | 2/2009 | Danford |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0064335 A1* | 3/2009 | Sinn .................... H04L 63/145 726/24 |
| 2009/0076791 A1 | 3/2009 | Rhoades et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0204514 A1 | 8/2009 | Bhogal et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271866 A1 | 10/2009 | Liske |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |

(56) References Cited

U.S. PATENT DOCUMENTS

| | | |
|---|---|---|
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0103837 A1 | 4/2010 | Jungck et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192057 A1 | 7/2010 | Majidian |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0275210 A1 | 10/2010 | Phillips et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0287613 A1 | 11/2010 | Singh et al. |
| 2010/0299754 A1 | 11/2010 | Amit et al. |
| 2010/0306173 A1 | 12/2010 | Frank |
| 2010/0306825 A1 | 12/2010 | Spivack |
| 2010/0332593 A1 | 12/2010 | Barash et al. |
| 2011/0004737 A1 | 1/2011 | Greenebaum |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0314546 A1* | 4/2011 | Aziz et al. ............ H04L 63/145 726/24 |
| 2011/0113231 A1 | 5/2011 | Kaminsky |
| 2011/0113427 A1 | 5/2011 | Dotan |
| 2011/0126232 A1 | 5/2011 | Lee et al. |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173178 A1 | 7/2011 | Conboy et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0302656 A1 | 12/2011 | El-Moussa |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0320816 A1 | 12/2011 | Yao et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0151587 A1* | 6/2012 | Wang ............... H04L 63/145 726/24 |
| 2012/0167219 A1 | 6/2012 | Zaitsev et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0284710 A1 | 11/2012 | Vinberg |
| 2012/0297489 A1 | 11/2012 | Dequevy |
| 2012/0304244 A1 | 11/2012 | Xie et al. |
| 2012/0317641 A1* | 12/2012 | Coskun ............ H04L 63/1425 726/22 |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0305369 A1* | 5/2013 | Karta et al. ......... H04L 63/1416 726/23 |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0247187 A1 | 9/2013 | Hsiao et al. |
| 2013/0263260 A1 | 10/2013 | Mahaffey et al. |
| 2013/0291109 A1 | 10/2013 | Staniford et al. |
| 2013/0298192 A1* | 11/2013 | Kumar ............ G06F 21/52 726/3 |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0333046 A1 | 12/2013 | Sambamurthy |
| 2014/0019963 A1 | 1/2014 | Deng et al. |
| 2014/0026217 A1 | 1/2014 | Saxena et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0096184 A1 | 4/2014 | Zaitsev |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0181975 A1 | 6/2014 | Spernow et al. |
| 2014/0189687 A1 | 7/2014 | Jung et al. |
| 2014/0189866 A1 | 7/2014 | Shifter et al. |
| 2014/0189882 A1 | 7/2014 | Jung et al. |
| 2014/0237600 A1 | 8/2014 | Silberman et al. |
| 2014/0258384 A1 | 9/2014 | Spikes et al. |

(56) References Cited

U.S. PATENT DOCUMENTS

| | | | |
|---|---|---|---|
| 2014/0259168 A1* | 9/2014 | McNamee | G06F 21/566 726/23 |
| 2014/0280245 A1 | 9/2014 | Wilson | |
| 2014/0283037 A1 | 9/2014 | Sikorski et al. | |
| 2014/0283063 A1 | 9/2014 | Thompson et al. | |
| 2014/0317735 A1 | 10/2014 | Kolbitsch et al. | |
| 2014/0325344 A1 | 10/2014 | Bourke et al. | |
| 2014/0328204 A1 | 11/2014 | Klotsche et al. | |
| 2014/0337836 A1 | 11/2014 | Ismael | |
| 2014/0344926 A1 | 11/2014 | Cunningham et al. | |
| 2014/0351935 A1 | 11/2014 | Shao et al. | |
| 2014/0380473 A1 | 12/2014 | Bu et al. | |
| 2014/0380474 A1 | 12/2014 | Paithane et al. | |
| 2015/0007312 A1 | 1/2015 | Pidathala et al. | |
| 2015/0026810 A1 | 1/2015 | Friedrichs et al. | |
| 2015/0074810 A1* | 3/2015 | Saher | G06F 16/951 726/23 |
| 2015/0096022 A1 | 4/2015 | Vincent et al. | |
| 2015/0096023 A1 | 4/2015 | Mesdaq et al. | |
| 2015/0096024 A1 | 4/2015 | Haq et al. | |
| 2015/0096025 A1 | 4/2015 | Ismael | |
| 2015/0121526 A1 | 4/2015 | McLarnon et al. | |
| 2015/0180886 A1 | 6/2015 | Staniford et al. | |
| 2015/0186296 A1* | 7/2015 | Guidry | H04L 63/0876 713/193 |
| 2015/0186645 A1 | 7/2015 | Aziz et al. | |
| 2015/0199513 A1 | 7/2015 | Ismael et al. | |
| 2015/0199531 A1 | 7/2015 | Ismael et al. | |
| 2015/0199532 A1 | 7/2015 | Ismael et al. | |
| 2015/0220735 A1 | 8/2015 | Paithane et al. | |
| 2015/0242627 A1 | 8/2015 | Lee et al. | |
| 2015/0244732 A1 | 8/2015 | Golshan et al. | |
| 2015/0363598 A1 | 12/2015 | Xu et al. | |
| 2015/0372980 A1 | 12/2015 | Eyada | |
| 2016/0004869 A1 | 1/2016 | Ismael et al. | |
| 2016/0006756 A1 | 1/2016 | Ismael et al. | |
| 2016/0044000 A1 | 2/2016 | Cunningham | |
| 2016/0127393 A1 | 5/2016 | Aziz et al. | |
| 2016/0191547 A1 | 6/2016 | Zafar et al. | |
| 2016/0191550 A1 | 6/2016 | Ismael et al. | |
| 2016/0261612 A1 | 9/2016 | Mesdaq et al. | |
| 2016/0285914 A1 | 9/2016 | Singh et al. | |
| 2016/0301703 A1 | 10/2016 | Aziz | |
| 2016/0335110 A1 | 11/2016 | Paithane et al. | |
| 2016/0357965 A1* | 12/2016 | Prowell | G06F 21/566 |
| 2016/0359880 A1* | 12/2016 | Pang | H04L 63/1425 |
| 2017/0083703 A1 | 3/2017 | Abbasi et al. | |
| 2017/0295089 A1 | 10/2017 | Saltsidis et al. | |
| 2018/0013770 A1 | 1/2018 | Ismael | |
| 2018/0048660 A1 | 2/2018 | Paithane et al. | |
| 2018/0121316 A1 | 5/2018 | Ismael et al. | |
| 2018/0288077 A1 | 10/2018 | Siddiqui et al. | |
| 2018/0357812 A1 | 12/2018 | Church | |
| 2019/0066377 A1 | 2/2019 | Schoening | |

FOREIGN PATENT DOCUMENTS

| | | |
|---|---|---|
| WO | WO-02/06928 | 1/2002 |
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | 2011/112348 A1 | 9/2011 |
| WO | 2012/075336 A1 | 6/2012 |
| WO | WO-2012/145066 | 10/2012 |
| WO | 2013/067505 A1 | 5/2013 |

OTHER PUBLICATIONS

Adobe Systems Incorporated, "PDF 32000-1:2008, Document management—Portable document format—Part1:PDF 1.7", First Edition, Jul. 1, 2008, 756 pages.

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aziz, Ashar, System and Method for Malware Containment, U.S. Appl. No. 14/620,060, filed Feb. 11, 2015, non-Final Office Action dated Apr. 3, 2015.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Cisco "Intrusion Prevention for the Cisco ASA 5500-x Series" Data Sheet (2012).

Clark, John, Sylvian Leblanc,and Scott Knight. "Risks associated with usb hardware trojan devices used by insiders." Systems Conference (SysCon), 2011 IEEE International. IEEE, 2011.

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek- .com/microsofts-honeymonkeys-show-patching-wi/167600716 [retrieved on Sep. 29, 2014].

Heng Yin et al, Panorama: Capturing System-Wide Information Flow for Malware Detection and Analysis, Research Showcase © CMU, Carnegie Mellon University, 2007.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

Mori, Detecting Unknown Computer Viruses, 2004, Springer-Verlag Berlin Heidelberg.

Oberheide et al., CloudAV.sub.—N-Version Antivirus in the Network Cloud, 17th USENIX Security Symposium USENIX Security '08 Jul. 28-Aug. 1, 2008 San Jose, CA.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Wahid et al., Characterising the Evolution in Scanning Activity of Suspicious Hosts, Oct. 2009, Third International Conference on Network and System Security, pp. 344-350.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

(56) References Cited

OTHER PUBLICATIONS

Zhang et al., The Effects of Threading, Infection Time, and Multiple-Attacker Collaboration on Malware Propagation, Sep. 2009, IEEE 28th International Symposium on Reliable Distributed Systems, pp. 73-82.
IEEE Xplore Digital Library Sear Results for "*detection of unknown computer worms*". Http//ieeexplore.ieee.org/searchresult.jsp?SortField=Score&SortOrder=desc&ResultC . . . (Accessed on Aug. 28, 2009).
AltaVista Advanced Search Results. "*Event Orchestrator*". Http://www.altavista.com/web/results?ltag=ody&pg=aq&aqmode=aqa=Event+Orchesrator . . . (Accessed on Sep. 3, 2009).
AltaVista Advanced Search Results. "*attack vector identifier*". Http://www.altavista.com/web/results?ltag=ody&pg=aq&aqmode=aqa=Event+Orchestrator . . . , (Accessed on Sep. 15, 2009).
Cisco, *Configuring the Catalyst Switched Port Analyzer (SPAN)* ("Cisco"), (1992-2003).
Reiner Sailer, Enriquillo Valdez, Trent Jaeger, Roonald Perez, Leendert van Doorn, John Linwood Griffin, Stefan Berger., *sHype: Secure Hypervisor Appraoch to Trusted Virtualized Systems* (Feb. 2, 2005) ("Sailer").
Excerpt regarding First Printing Date for Merike Kaeo, *Designing Network Security* ("Kaeo"), (2005).
*The Sniffers's Guide to Raw Traffic* available at: yuba.stanford.edu/~casado/pcap/section1.html, (Jan. 6, 2014).
NetBIOS Working Group. *Protocol Standard for a NetBIOS Service on a TCP/UDP transport: Concepts and Methods*. STD 19, RFC 1001, Mar. 1987.
"Network Security: NetDetector—Network Intrusion Forensic System (NIFS) Whitepaper", ("*NetDetector Whitepaper*"), (2003).
"Packet", *Microsoft Computer Dictionary, Microsoft Press*, (Mar. 2002), 1 page.
"When Virtual is Better Than Real", *IEEEXplore Digital Library*, available at, http://ieeexplore.ieee.org/xpl/articleDetails.jsp?reload=true&arnumber=990073, (Dec. 7, 2013).
Abdullah, et al., *Visualizing Network Data for Intrusion Detection*, 2005 IEEE Workshop on Information Assurance and Security, pp. 100-108.
Adetoye, Adedayo , et al., "Network Intrusion Detection & Response System", ("Adetoye"), (Sep. 2003).
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", *Springer-verlag Berlin Heidelberg*, (2006), pp. 165-184.
Bayer, et al., "Dynamic Analysis of Malicious Code", *J Comput Virol*, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.
Cohen, M.I. , "PyFlag—An advanced network forensic framework", *Digital investigation 5*, Elsevier, (2008), pp. S112-S120.
Costa, M. , et al., "Vigilante: End-to-End Containment of Internet Worms", *SOSP'05, Association for Computing Machinery, Inc.*, Brighton U.K., (Oct. 23-26, 2005).
Crandall, J.R. , et al., "Minos:Control Data Attack Prevention Orthogonal to Memory Model", *37th International Symposium on Microarchitecture*, Portland, Oregon, (Dec. 2004).
Deutsch, P. , ""Zlib compressed data format specification version 3.3" Rfc 1950, (1996)".
Distler, "Malware Analysis: An Introduction", *SANS Institute InfoSec Reading Room*, SANS Institute, (2007).
Dunlap, George W. , et al., "ReVirt: Enabling Intrusion Analysis through Virtual-Machine Logging and Replay", *Proceeding of the 5th Symposium on Operating Systems Design and Implementation*, USENIX Association, ("Dunlap"), (Dec. 9, 2002).

Filiol, Eric , et al., "Combinatorial Optimisation of Worm Propagation on an Unknown Network", International Journal of Computer Science 2.2 (2007).
Goel, et al., *Reconstructing System State for Intrusion Analysis*, Apr. 2008 SIGOPS Operating Systems Review, vol. 42 Issue 3, pp. 21-28.
Hjelmvik, Erik , "Passive Network Security Analysis with NetworkMiner", *(IN)SECURE*, Issue 18, (Oct. 2008), pp. 1-100.
Kaeo, Merike , "Designing Network Security", ("Kaeo"), (Nov. 2003).
Kim, H. , et al., "Autograph: Toward Automated, Distributed Worm Signature Detection", *Proceedings of the 13th Usenix Security Symposium* (Security 2004), San Diego, (Aug. 2004), pp. 271-286.
King, Samuel T., et al., "Operating System Support for Virtual Machines", ("King").
Krasnyansky, Max , et al., *Universal TUN/TAP driver*, available at https://www.kernel.org/doc/Documentation/networking/tuntap.txt (2002) ("Krasnyansky").
Kreibich, C. , et al., "Honeycomb-Creating Intrusion Detection Signatures Using Honeypots", *2nd Workshop on Hot Topics in Networks* (HotNets-11), Boston, USA, (2003).
Kristoff, J. , "Botnets, Detection and Mitigation: DNS-Based Techniques", *NU Security Day*, (2005), 23 pages.
Liljenstam, Michael , et al., "Simulating Realistic Network Traffic for Worm Warning System Design and Testing", *Institute for Security Technology studies*, Dartmouth College, ("Liljenstam"), (Oct. 27, 2003).
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", *INFOCOM*, vol. 3, (Mar. 30-Apr. 3, 2003), pp. 1901-1910.
Morales, Jose A., et al., ""Analyzing and exploiting network behaviors of malware."", *Security and Privacy in Communication Networks*. Springer Berlin Heidelberg, 2010. 20-34.
Natvig, Kurt , "SANDBOXII: Internet", *Virus Bulletin Conference*, ("Natvig"), (Sep. 2002).
Newsome, J. , et al., "Dynamic Taint Analysis for Automatic Detection, Analysis, and Signature Generation of Exploits on Commodity Software", *In Proceedings of the 12th Annual Network and Distributed System Security, Symposium (NDSS '05)*, (Feb. 2005).
Newsome, J. , et al., "Polygraph: Automatically Generating Signatures for Polymorphic Worms", *In Proceedings of the IEEE Symposium on Security and Privacy*, (May 2005).
Nojiri, D. , et al., "Cooperation Response Strategies for Large Scale Attack Mitigation", *DARPA Information Survivability Conference and Exposition*, vol. 1, (Apr. 22-24, 2003), pp. 293-302.
Peter M. Chen, and Brian D. Noble , "When Virtual Is Better Than Real, Department of Electrical Engineering and Computer Science", *University of Michigan* ("Chen").
Silicon Defense, "Worm Containment in the Internal Network", (Mar. 2003), pp. 1-25.
Singh, S. , et al., "Automated Worm Fingerprinting", *Proceedings of the ACM/USENIX Symposium on Operating System Design and Implementation*, San Francisco, California, (Dec. 2004).
Spitzner, Lance , "Honeypots: Tracking Hackers", ("Spizner"), (Sep. 17, 2002).
Thomas H. Ptacek, and Timothy N. Newsham , "Insertion, Evasion, and Denial of Service: Eluding Network Intrusion Detection", *Secure Networks*, ("Ptacek"), (Jan. 1998).
Venezia, Paul , "NetDetector Captures Intrusions", *InfoWorld Issue 27*, ("Venezia"), (Jul. 14, 2003).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference*, Las Vegas, NV, USA, (Dec. 2002), pp. 1-9.
"Mining Specification of Malicious Behavior"—Jha et al, UCSB, Sep. 2007 https://www.cs.ucsb.edu/.about.chris/research/doc/esec07.sub.--mining.pdf-.

(56) References Cited

OTHER PUBLICATIONS

Bowen, B. M. et al "BotSwindler: Tamper Resistant Injection of Believable Decoys in VM-Based Hosts for Crimeware Detection", in Recent Advances in Intrusion Detection, Springer ISBN: 978-3-642-15511-6 (pp. 118-137) (Sep. 15, 2010).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
PCT/US2014/043726 filed Jun. 23, 2014 International Search Report and Written Opinion dated Oct. 9, 2014.
PCT/US2015/067082 filed Dec. 21, 2015 International Search Report and Written Opinion dated Feb. 24, 2016.
U.S. Appl. No. 13/925,688, filed Jun. 24, 2013 Final Office Action dated Jan. 12, 2017.
U.S. Appl. No. 13/925,688, filed Jun. 24, 2013 Final Office Action dated Mar. 11, 2016.
U.S. Appl. No. 13/925,688, filed Jun. 24, 2013 Non-Final Office Action dated Jun. 2, 2015.
U.S. Appl. No. 13/925,688, filed Jun. 24, 2013 Non-Final Office Action dated Sep. 16, 2016.
U.S. Appl. No. 14/229,541, filed Mar. 28, 2014 Non-Final Office Action dated Apr. 20, 2016.
U.S. Appl. No. 14/579,896, filed Dec. 22, 2014 Advisory Action dated Aug. 23, 2016.
U.S. Appl. No. 14/579,896, filed Dec. 22, 2014 Final Office Action dated Jul. 6, 2016.
U.S. Appl. No. 14/579,896, filed Dec. 22, 2014 Non-Final Office Action dated Mar. 22, 2016.
U.S. Appl. No. 14/579,896, filed Dec. 22, 2014 Non-Final Office Action dated Oct. 18, 2016.
U.S. Appl. No. 14/579,896, filed Dec. 22, 2014 Notice of Allowance dated Mar. 1, 2017.
U.S. Appl. No. 14/586,233, filed Dec. 30, 2014 Advisory Action dated Jun. 13, 2017.
U.S. Appl. No. 14/586,233, filed Dec. 30, 2014 Final Office Action dated Mar. 9, 2017.
U.S. Appl. No. 14/586,233, filed Dec. 30, 2014 Non-Final Office Action dated Aug. 24, 2016.
U.S. Appl. No. 14/675,648, filed Mar. 31, 2015 Notice of Allowance dated Jul. 5, 2016.
U.S. Appl. No. 15/339,459, filed Oct. 31, 2016 Non-Final Office Action dated Feb. 9, 2017.
U.S. Appl. No. 15/451,243, filed Mar. 6, 2017 Notice of Allowance dated Jul. 26, 2017.
Vladimir Getov: "Security as a Service in Smart Clouds—Opportunities and Concerns", Computer Software and Applications Conference (COMPSAC), 2012 IEEE 36TH Annual, IEEE, Jul. 16, 2012 (Jul. 16, 2012).

* cited by examiner

INFECTION VECTOR AND MALWARE TRACKING WITH AN INTERACTIVE USER DISPLAY

1. FIELD

Embodiments of the disclosure relate to the field of network security. More specifically, one embodiment of the disclosure relates to a system and method for generating an interactive user display that illustrates information representing the infection vector for malware and the propagation of the malware over one or more networks and network devices.

2. GENERAL BACKGROUND

Over the last decade or so, malicious software has become a pervasive problem for Internet users as most computers include vulnerabilities that are subject to attack. For instance, over the past few years, more and more vulnerabilities are being discovered, especially in software that is loaded onto a networked computer or other electronic device. While some vulnerabilities may be addressed through software patches (e.g., operating system "OS" vulnerabilities), electronic devices will continue to be targeted for attack in efforts to acquire sensitive information or adversely affect operations of various enterprises.

Currently, the origin and target of malware attacks can be determined and displayed in order to illustrate a trajectory of the malware attack, namely an illustration of the country-based geographic origin of the malware attack and its entry point into an enterprise network. However, this display does not provide any further information regarding the infection vector and fails to provide a holistic view of the entire malware attack, most notably the enterprise network, which would be highly valued by network security personnel.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
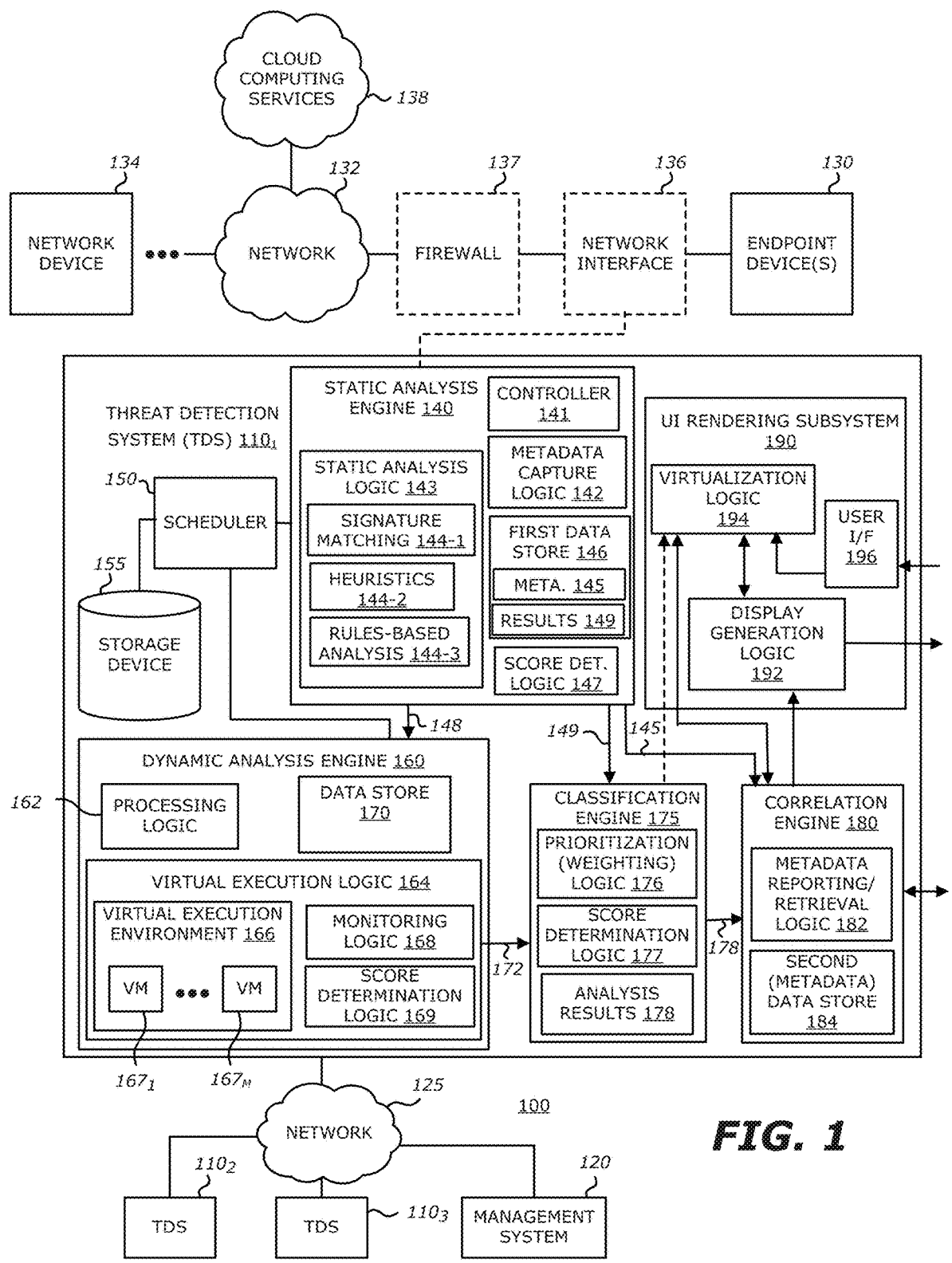
FIG. 1 is a block diagram of a first embodiment of an exemplary network adapted with a first type of threat detection system (TDS) utilizing static and dynamic analysis of objects under analysis.

Various embodiments of the disclosure relate to a threat detection system that improves an existing technological process of malware detection. In the form of a security appliance or security cloud services for example, the threat detection system includes virtualization logic that generates one or more displays (hereinafter, "display(s)") that are adapted to illustrate, alone or collectively, the propagation of malware associated with a malware attack as well as the method of propagation referred to as the "infection vector". These display(s) provide network security personnel with an ability to trace, by viewing geographical depictions, the propagation of malware within the enterprise network and/or its propagation path outside of the enterprise network. These display(s) also improve the speed and accuracy of diagnostics by network security personnel as well as improve the speed and accuracy in identifying targeted malicious attacks.

More specifically, the virtualization logic may be activated automatically in response to an alert condition that signifies detection of a malicious attack by a threat detection system within the enterprise network. Alternatively, the virtualization logic may be activated in accordance with a time-based schedule or manually by a user. For instance, the virtualization logic may be activated manually upon selecting a particular alert associated with the malicious attack, where one or more alerts may be concurrently presented on a malware display screen, and then subsequently selecting a prescribed item on the display screen (e.g., "infection vector" button).

After activation, the virtualization logic may be adapted to obtain metadata from a correlation engine, where the metadata may include metadata associated with malicious objects detected by a particular threat detection system having the virtualization logic as well as metadata associated with other malicious objects detected by other systems within the enterprise network and/or metadata gathered from endpoint devices. The virtualization logic generates a chronological, holistic view of the propagation of a particular malware infection, where each node (e.g., network device or collection of network devices) of the enterprise network represents a "hop" in the propagation. This provides network security personnel with one or more displays directed to the origination of the alert (e.g., continent, country, state/region, city, street, address, or other location) along with every "hop" on the geographic propagation path to identify which network device(s) within the enterprise may have been infected by the particular malware. Metadata associated with hops outside the enterprise network may be retrieved by accessing traffic origination geo-servers, namely dedicated or third party servers that monitor traffic through public networks.

By illustration, each hop may be selected to display additional information, including (1) metadata directed to at least one network device of the hop and/or (2) metadata associated with the malware. For instance, with respect to selection of a network device associated with a particular hop, any or all of the following metadata directed to that network device may be gathered and accessible for use by the virtualization logic for display: (1) host name for the network device; (2) address information such as Internet Protocol "IP" address or Media Access Control "MAC" address of the network device; (3) connection type and/or speed used by the network device; (4) determined geographic location of the network device based on the assigned IP address for example; (5) mode of operation (e.g., detection or prevention mode); (6) subnet membership; and/or (7) particulars regarding characteristics of the network device such as storage size. With respect to metadata associated with the malware, any or all of the following may be gathered and accessible for use by the virtualization logic for display: (a) time of receipt of the malware; (b) known family of the malware; (c) types of malicious activity conducted such as information compromised or stolen via call-back, etc.; and/or (d) information that identifies the infection vector and represents the lateral spread of the infection (e.g., sequence of images and/or video of changes in operational state of the network device(s)).

I. Terminology

In the following description, certain terminology is used to describe aspects of the invention. For example, in certain situations, both terms "logic" and "engine" are representative of hardware, firmware and/or software that is configured to perform one or more functions. As hardware, logic (or engine) may include circuitry having data processing or storage functionality. Examples of such processing or storage circuitry may include, but is not limited or restricted to a processor; one or more processor cores; a programmable gate array; a microcontroller; an application specific integrated circuit; receiver, transmitter and/or transceiver circuitry; semiconductor memory; or combinatorial logic.

Logic (or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, such as a group of related packets, normally having a logical structure or organization that enables classification for purposes of analysis. For instance, an object may be a self-contained element, where different types of such objects may include an executable file, non-executable file (such as a document or a dynamically link library), a Portable Document Format (PDF) file, a JavaScript™ file, Zip™ file, a Flash file, a document (for example, a Microsoft Office® document), an email, downloaded web page, an instant messaging element in accordance with Session Initiation Protocol (SIP) or another messaging protocol, or the like.

The term "flow" generally refers to a collection of related objects, communicated during a single communication session (e.g., Transport Control Protocol "TCP" session), perhaps between a source device and a destination device. An endpoint device may be one of the source, intermediary, or destination devices.

A "message" generally refers to information transmitted as information in a prescribed format, where each message may be in the form of one or more packets or frames, a Hypertext Transfer Protocol (HTTP) based transmission, or any other series of bits having the prescribed format. "Metadata" is information that describes data (e.g., a particular object, message, flow, etc.).

The term "transmission medium" is a physical or logical communication path with an endpoint device, which is an electronic device with data processing and/or network connectivity such as, for example, a server; a stationary or portable computer including a desktop computer, laptop, electronic reader, netbook or tablet; a smart phone; a video-game console; wearable technology (e.g., watch phone, etc.). For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In certain instances, the term "exploit" may be construed as information (e.g., executable code, data, command(s), etc.) that attempts to take advantage of any type of vulnerability in a network. For instance, an exploit may be a vulnerability associated with human activity or may be a software vulnerability. One type of software vulnerability may be a coding error or artifact of software (e.g., computer program) that allows an attacker to alter legitimate control flow during processing of the software (computer program) by an electronic device, and thus, causes the electronic device to experience undesirable or unexpected behaviors.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architectures

Referring to FIG. 1, an exemplary block diagram of a network 100 deploying a plurality of threat detection systems (TDSes) $110_1$-$110_N$ (N>1, where N=3 for this embodiment) communicatively coupled to a management system 120 via a network 125 is shown. In general, the management system 120 is adapted to manage each TDS 110$_1$-110$_3$. For instance, the management system 120 may be configured to perform content updates (e.g., upload new rules or modified rules, delete rules, modify parameters that are utilized by the rules, or upload metadata stored within other TDSes or certain metadata associated with the one or more endpoint devices 130) within a static analysis engine 140, a dynamic analysis engine 160, a classification engine 175, a correlation engine 180, and/or a user interface (UI) rendering subsystem 190.

As shown in FIG. 1, a first threat detection system (TDS) 110$_1$ is an electronic device that is adapted to analyze information associated with network traffic over a communication network 132 from/to one or more endpoint devices 130. The communication network 132 may include a public network such as the Internet, a private network such as a wireless data telecommunication network, wide area network, a type of local area network (LAN), or a combination of networks.

As shown, the first TDS 110$_1$ may be communicatively coupled with the communication network 132 via a network interface 136. In general, the network interface 136 operates as a data capturing device (sometimes referred to as a "tap" or "network tap") that is configured to receive data propagating to/from one or more endpoint devices 130 (hereinafter, "endpoint device(s)") and provide at least some of this data to the first TDS 110$_1$ or a duplicated copy of the data. This data includes metadata.

More specifically, the network interface 136 is configured to capture metadata from network traffic associated with one or more endpoint device(s) 130. According to one embodiment of the disclosure, the metadata may be used, at least in part, to determine protocols, application types and other information that may be used by logic within the first TDS 110$_1$ to determine particular software profile(s). The software profile(s) are used for selecting and/or configuring a run-time environment in which one or more virtual machines are selected or configured as part of the virtual execution logic 164 within the dynamic analysis engine 160, as described below. These software profile(s) may be directed to different software or different versions of the same software application extracted from software image(s) fetched from storage device 155. Additionally, the metadata may provide information about the origin of the network traffic and characteristics of the network traffic (e.g., communication speed, etc.), which can be used in the generation of one or more displays that, alone or collectively, provide a holistic view of the propagation of detected malware.

In some embodiments, although not shown, network interface 136 may be contained within the first TDS 110$_1$. In other embodiments, the network interface 136 can be integrated into an intermediary device in the communication path (e.g., a firewall, router, switch or other networked electronic device) or can be a standalone component, such as an appropriate commercially available network tap.

As further shown in FIG. 1, the first TDS 110$_1$ includes static analysis engine 140, a scheduler 150, storage device 155, dynamic analysis engine 160, classification engine 175, correlation engine 180, and UI rendering subsystem 190. Herein, the static analysis engine 140 may include one or more controllers 141 (e.g., processing circuitry such as one or more processors) that are configured to process metadata capture logic 142 and static analysis logic 143. Of course, it is contemplated that the controller(s) 141 may be separate from the static analysis engine 140 but having access to logic within the static analysis engine 140.

The metadata capture logic 142 is responsible for extracting and/or generating metadata 145 contained with and/or associated with network traffic. The metadata 145 may be identified as being associated with a particular object under analysis (e.g., assigned an identifier "object_ID" or stored in a specific storage location to identify that the metadata 145 corresponds to the particular object), temporarily stored in a first data store 146, and subsequently provided to a second (metadata) data store 184 that is maintained by correlation engine 180. Examples of types of metadata may include, but is not restricted or limited to the host name of a network device (e.g., network device 134) that is sending the flow, its IP or MAC address, type and/or speed of connection used by the network device 134 to network 132, time of original transmission of the flow (e.g., date/time from a first timestamp), time of detection of the flow (e.g., date/time from a timestamp made by the first TDS 110$_1$), and/or any geographic information obtained from the flow (e.g., domain name country designation, etc.).

Besides the metadata described above, it is contemplated that additional metadata may be provided with the network traffic, including information associated with endpoint devices that have received the incoming network traffic prior to monitoring by the first TDS 110$_1$. Examples of the information may include the network device name, device type, MAC address, date/time of receipt, and/or its subnet. Of course, as described below, this metadata may be obtained through sideband communications with these and other endpoint devices 130. The sideband communications are managed by metadata reporting/retrieval logic 182 in the correlation engine 180, as described below.

While the metadata 145 may be provided directly to the second (metadata) data store 184 and later associated with results from the static and/or dynamic analysis of the particular object as described above, as an alternative embodiment, the metadata 145 may be provided to the classification engine 175. According to this embodiment, information pertaining to the particular object (e.g., metadata 145, static analysis results 149 and VM-based results 172) is aggregated to formulate analysis results 178 (described below), which is subsequently provided to the second (metadata) data store 184.

Referring still to FIG. 1, the static analysis logic 143 includes one or more software modules that, when executed by one or more controllers 141, analyzes characteristics for one or more objects within an incoming flow, which may be a portion of network traffic according to this embodiment of the disclosure. Such analysis may involve a static analysis of the characteristics of each object under analysis, where the static analysis includes one or more checks being conducted on the object without its execution. Examples of the checks may include signature matching 144-1, heuristics 144-2, determinative rule-based analysis 144-3 that may include blacklist or whitelist checking, or the like.

For instance, the static analysis engine 140 may handle heuristics 144-2, where one or more portions of an object are analyzed to determine whether such portions correspond to a "suspicious identifier". An example of a suspicious identifier may include a particular Uniform Resource Locator (URL) that is associated with known exploits, or a particular source or destination address (e.g., IP addresses, Media Access Control "MAC" addresses, etc.) that may be associated with known exploits. Other examples of a suspicious identifier may include, but are not limited or restricted to one or more exploit patterns or one or more particular shell code patterns.

Additionally or in the alternative, the static analysis engine 140 may be communicatively coupled to receive one or more objects from network traffic which may be related or unrelated to each other. For instance, one object may be a series of HTTP packets operating as a flow routed over the network. The static analysis engine 140 includes one or more controllers that may be configured to conduct signature matching analysis 144-1, such as exploit signature checks that involve a comparison of at least a portion of the object under analysis with one or more pre-stored exploit signatures (pre-configured and predetermined attack patterns) from signature database (not shown). Alternatively or in combination with exploit signature checks, the signature matching analysis 144-1 may include vulnerability signature checks, namely a process for uncovering deviations in messaging practices set forth in applicable communication protocols (e.g., HTTP, TCP, etc.). As an illustrative example, HTTP messages may be analyzed to determine compliance with certain message formats established for the protocol (e.g., out-of-order commands). Furthermore, payload parameters of the HTTP messages may be analyzed to determine further compliance.

Upon detecting a match during the signature matching analysis (e.g., an object under analysis has characteristics that suggest the object is an exploit), the static analysis engine 140 determines that the object is "suspicious," namely has characteristics that suggest the object is an exploit, and routes this suspect object to the dynamic analysis engine 160 for more in-depth analysis.

In general, referring still to FIG. 1, the static analysis engine 140 is communicatively coupled to receive network traffic such as a series of HTTP messages. The static analysis engine 140 may be configured to parse the incoming network traffic, and thereafter, conduct a static analysis of one or more objects within the network traffic (e.g., within the flow). The results of the static analysis 149 for one or more objects that appear to be "suspicious" may be stored within the first data store 146. The static analysis results 149 may include (i) a static analysis score (described below) and/or (ii) metadata that at least includes (a) characteristics associated with malware (e.g., matched signature patterns, certain heuristic or statistical information, etc.), and/or (b) other types of metadata associated with the object under analysis (e.g., name of malware or its family based on the detected exploit signature, anticipated malicious activity associated with this type of malware, etc.).

According to one embodiment of the disclosure, in addition (or in the alternative) to being stored in the first data store 146, some or all of the static analysis results 149 may be subsequently routed to classification engine 175 for storage as part of analysis results 178. Of course, when the metadata 145 is provided to the classification engine 175 in lieu of being provided directly to the correlation engine 180, the metadata uncovered for that object during static and/or virtual processing may be combined with the metadata 145 to produce the analysis results 178. The analysis results 178 are subsequently routed to correlation engine 180 for storage within the second (metadata) data store 184. As identified by a dashed line, the classification engine 175 may also notify virtualization logic 194 within the UI rendering subsystem 190 of the detection of malware (and storage of corresponding metadata), especially where the generation of displays outlining the propagation of malware is triggered by detection of malware.

According to another embodiment of the disclosure, in addition (or in the alternative) to the metadata 145 being stored in the first data store 146, a portion of the static analysis results 149, such as the metadata gathered during the static analysis for example, may be directly routed from the static analysis engine 140 to the correlation engine 180 for storage within the second (metadata) data store 184. According to this embodiment, some or all of the VM-based results 172 (described below) would constitute the analysis results 178, where certain metadata associated with the results may be provided to correlation engine 180 and stored in the second (metadata) data store 184 along with its corresponding metadata from the static analysis results 149.

When implemented within the static analysis engine 140, a score determination logic 147 may be configured to determine a probability (or level of confidence) that a suspect object 148 is part of a malicious attack. More specifically, based on the static analysis, the score determination logic 147 may be configured to generate a value (referred to as a "static analysis score") that may be used to identify the likelihood that the suspect object 148 is part of a malicious attack.

After analysis of objects within the flow, the static analysis engine 140 may route one or more "suspect" objects (e.g., suspect object 148) to the dynamic analysis engine 160, which is configured to provide more in-depth analysis by analyzing the behavior of the suspect object 148 in a VM-based operating environment. Although not shown, the suspect object 148 may be buffered by the first data store 146 until ready for processing by virtual execution logic 164. As stated above, metadata associated with the suspect object 148 may be routed to the classification engine 175 for collective storage with results from its VM analysis (analysis results 178) prior to placement within the second data store 184 or to the data store 184 of the correlation engine 180 directly. The metadata is accessible by the virtualization logic 194.

More specifically, after analysis of the characteristics of the suspect object 148 has been completed, the static analysis engine 140 may provide some or all of the suspect object 148, which may be identified by an assigned object_ID, to the dynamic analysis engine 160 for in-depth dynamic analysis by one or more virtual machines (VMs) $167_1$-$167_M$ (M≥1) of the virtual execution logic 164. For instance, the virtual execution logic 164, operating in combination with processing logic 162 (described below), is adapted to simulate the transmission and/or receipt of signaling by a destination device represented by VM $167_1$. Of course, if the object under analysis is not suspected of being part of a malicious attack, the static analysis engine 140 may simply denote that the object is benign and refrain from passing the object to the dynamic analysis engine 160 for analysis.

According to one embodiment, the scheduler 150 may be adapted to configure the VMs $167_1$-$167_M$ based on metadata associated with the flow received by the static analysis engine 140. For instance, the VMs $167_1$-$167_M$ may be configured with software profiles corresponding to the software images stored within storage device 155. As an alternative embodiment, the VMs $167_1$-$167_M$ may be configured according to one or more software configurations that are being used by electronic devices connected to a particular enterprise network (e.g., endpoint device(s) 130) or prevalent types of software configurations (e.g., a Windows® 7 OS; a certain version of a particular web browser such as Internet Explorer®; Adobe® PDF™ reader application). As yet another alternative embodiment, the VMs $167_1$-$167_M$ may be configured to support concurrent virtual execution of a variety of different software configurations in efforts to verify that the suspect object is part of a malicious attack (e.g., reconnaissance operations, entry-point testing, exploit, etc.). Of course, it is contemplated that the VM configuration described above may be handled by logic other than the scheduler 150.

According to one embodiment of the disclosure, the dynamic analysis engine 160 is adapted to execute one or more VMs $167_1$-$167_M$ to simulate the receipt and execution of content associated with the suspect object 148 within a run-time environment as expected by the type of object. For instance, dynamic analysis engine 160 may optionally include processing logic 162 to emulate and provide anticipated signaling to the VM(s) $167_1$, . . . , and/or $167_M$ during virtual processing.

As an example, the processing logic 162 may be adapted to provide, and sometimes modify information associated with the suspect object 148 (e.g., IP address, etc.) in order to control return signaling back to the virtual execution environment 166. Hence, the processing logic 162 may suppress (e.g., discard) the return network traffic so that the return network traffic is not transmitted to the communication network 132. According to one embodiment of the disclosure, for a particular suspect object 148 being multiple related flows such as TCP or UDP flows, the processing logic 162 may be configured to send one or more packets to the virtual execution environment 166 via a TCP connection or UDP session. Furthermore, the processing logic 162 synchronizes return network traffic by terminating the TCP connection or UDP session.

As further shown in FIG. 1, the monitoring logic 168 within the virtual execution logic 164 may be configured to monitor behaviors of one or more VMs $167_1$, . . . , and/or $167_M$, such as VM $167_1$ that is responsible for executing the suspect object 148. This monitoring is conducted to detect anomalous activity indicative that the suspect object 148 is part of a malicious attack. When anomalous activity is detected, the monitoring logic 168 operating with an optional score determination logic 169 may route the VM-based results 172 to the classification engine 175. The VM-based results 172 may include computed score, information associated with the detected anomalous behaviors; additional metadata pertaining to the malware and/or targeted network device learned through virtual processing such as malware name, malware family, type of malicious activity (e.g., email phishing, callback, etc.), date of detection, targeted application and/or version, operating system, attempt to laterally spread malware, and/or any other information associated with the detected malicious activity by the suspect object 148.

It is noted that the score determination logic 169 may not be implemented within the dynamic analysis engine 160 so that the VM-based results 172 exclude any scores, but rather includes information associated with the detected anomalous behaviors that are analyzed by the monitoring logic 168. Certain portions of the VM-based results 172 (e.g., scores and/or anomalous behaviors) may be subsequently weighted by the prioritization logic 176 and analyzed by the score determination logic 177 implemented within the classification engine 175.

According to one embodiment of the disclosure, the classification engine 175 may be configured to receive the static analysis results 149 ((perhaps metadata 145 as described above) and/or the VM-based results 172. According to one embodiment of the disclosure, the classification engine 175 includes prioritization logic 176 and/or score determination logic 177. The prioritization logic 176 may be configured to apply weighting to a portion of the VM-based 172 provided from dynamic analysis engine 160 and/or a portion of the static analysis results 149 provided from static analysis engine 140. For instance, the weighting may be applied to a "dynamic analysis score" produced by score determination logic 169 and/or a "static analysis score" produced by score determination logic 145. It is contemplated that some or all of the other information within the VM-based results, such as metadata within the static analysis results 149 and/or information associated with anomalous behaviors detected by monitoring logic 168 for example, may be stored as analysis results 178 and subsequently routed to the second (metadata) data store 184 without being operated upon by the prioritization logic 176 and/or the score determination logic 177.

According to one embodiment of the disclosure, the score determination logic 177 includes one or more software modules that are used to determine a final probability as to whether the suspect object is part of a malicious attack. The resultant (final) score representative of this final probability may be included as part of analysis results 178, which may be subsequently stored with metadata corresponding to that suspect object in the second (metadata) data store 184 of the correlation engine 180. Where the score determination logic 177 has failed to determine that the suspect object 148 is malicious based on the static analysis results 149 (e.g., static analysis score, etc.) and/or the VM-based results 172 (e.g., dynamic analysis score, etc.), the classification engine 175 may refrain from providing the results to data store 184.

Referring still to FIG. 1, the correlation engine 180 includes metadata reporting/retrieval logic 182 and second (metadata) data store 184. The metadata reporting/retrieval logic 182 may be configured to establish communications with cloud computing services 138, management system 120, and/or correlation engines within other TDSes (e.g., TDSes $110_2$ and $110_3$). These communications enable the correlation engine 180 to receive metadata associated with malicious objects detected outside the first TDS $110_1$ and to output metadata associated with malicious objects detected by the first TDS $110_1$.

It is contemplated that, in order to establish communications, the metadata reporting/retrieval logic 182 needs necessary network address information to contact the other TDSes and uniquely identify the correlation engine operating on each of these TDSes. If the metadata reporting/retrieval logic 182 is unable to uniquely identify the correlation engine, then it will be unable to correctly organize the gathered metadata for accurate geographical depiction of the network and the characteristics associated with each network device. Furthermore, these communications may be established upon issuance of the request by the virtualization logic 194 or even prior to issuance of the request through automatic or manual triggering events such as a scheduled, time-based metadata exchange. According to one embodiment, some of the functionality of the correlation engine 180 may be consistent with controller-based operations as described in U.S. patent application Ser. No. 13/073,357 filed Mar. 28, 2011 and incorporated herewith by reference.

Additionally, the metadata reporting/retrieval logic 182 may be further configured to establish communications with endpoint device(s) 130 in order to receive metadata associated with the endpoint device(s) 130 so that the virtualization logic 194 can provide an interactive display of the network 100, which may be used to provide a holistic view of an entire malware attack. For instance, the metadata reporting/retrieval logic 182 may communication with each endpoint device 130 to obtain its audit log. An audit log may include prior and/or current state information for that endpoint device and other metadata that may be used to identify the endpoint device, which may have become infected by receipt of an object of the network traffic determined to be malicious. For instance, where the endpoint device(s) 130 is implemented with signature matching logic for use in malware detection at the endpoint, the metadata associated with the audit log may include a detected malware signature and/or a malware name for the detected malware.

Herein, according to one embodiment of the disclosure, the UI rendering subsystem 190 includes display generation logic 192 which, under control of the virtualization logic 194, is adapted to generate one or more geographical displays that illustrate the infection vector and the propagation of the malware across the network 100. Additionally, the propagation of the malware prior to its entry into and/or exit from the network 100 may be geographically displayed. The virtualization logic 194 may be activated manually via user interface 196. Alternatively, the virtualization logic 194 may be activated automatically (without user intervention) upon detection of a malicious attack by display generation logic 192. Such detection may be accomplished by the display generation logic 192 monitoring at least a portion of the metadata (e.g., final score value computed by score determination logic 177) received from the second data store 184 and activating the virtualization logic 194 when this score value signifies an extremely high probability (e.g., greater than 99% likelihood) of a malicious attack. As yet another alternative, the virtualization logic 194 may be activated by a real-time clock (not shown) upon occurrence of a time-based scheduled event.

Upon activation, the virtualization logic 194 may issue a request for metadata to the correlation engine 180 in order to generate display(s) that illustrates the propagation of a particular malware associated with a malware attack as well as the infection vector, where the metadata may include metadata associated with malicious objects detected by TDS $110_1$ as well as metadata associated with malicious objects detected by other network devices such as TDS $110_2$ and $110_3$ or metadata associated with the endpoint device(s) 130 for example. The operations by the metadata reporting/retrieval logic 182 in obtaining metadata from other network devices may be performed prior to issuance of the request by the virtualization logic 194 through automatic or manual triggering events such as a scheduled, time-based metadata exchange.

Herein, the virtualization logic 194 may be pre-loaded with (i) metadata for accessing certain web-based information (e.g., Google® maps for map generation, etc.), (ii) metadata associated with the network device(s) of the network 100, and/or (iii) logic that is adapted to gather metadata from the correlation engine 180. This particular metadata may be used in the generation of geographical displays for illustrating the propagation of the malware as well as the characteristics of the detected malware.

Figure 2:
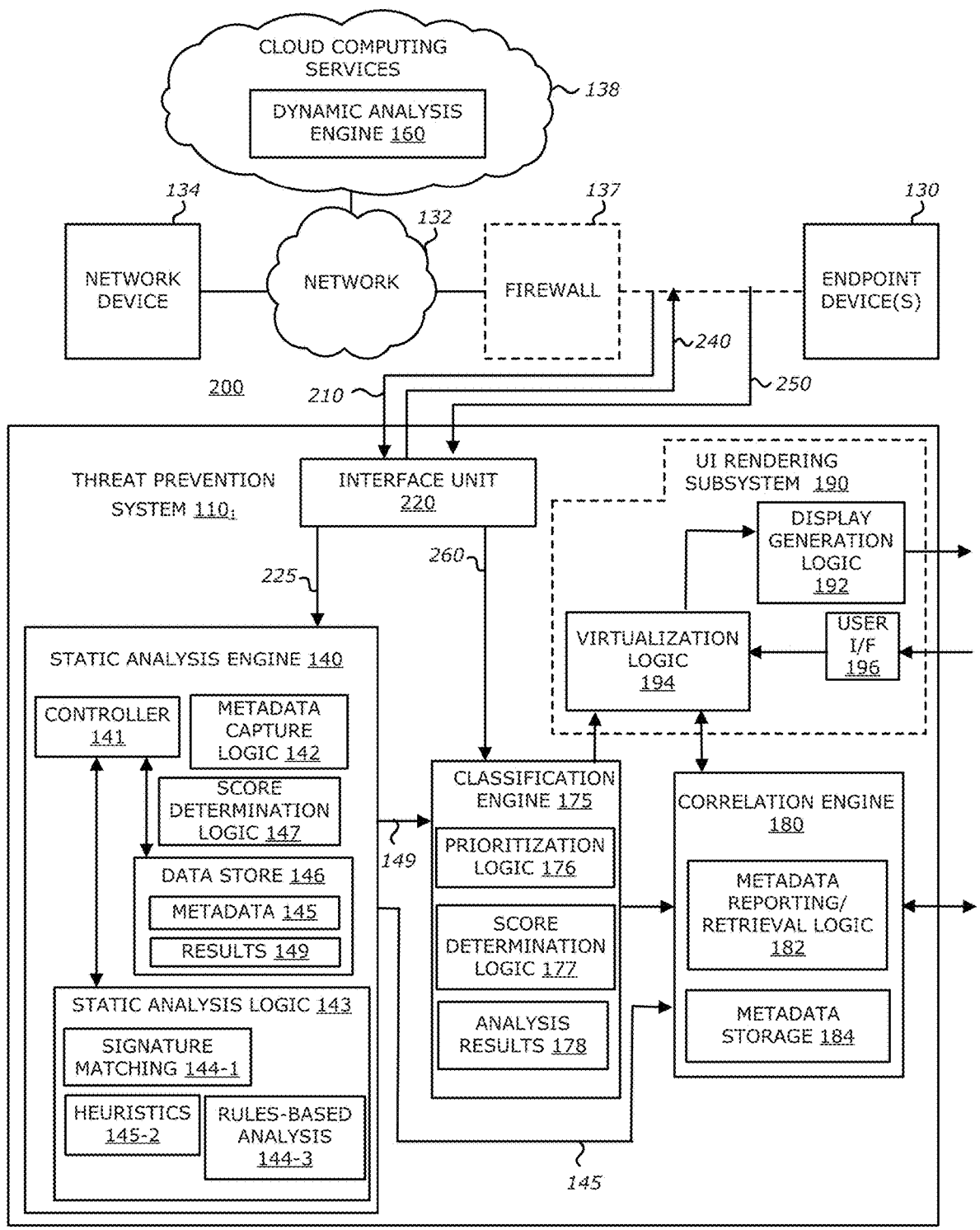
FIG. 2 is a block diagram of a second embodiment of an exemplary network adapted with a second type of TDS.

Referring now to FIG. 2, a block diagram of a second embodiment of an exemplary network adapted with another configuration for the first TDS $110_1$ is shown. According to one embodiment of the disclosure, the first TDS $110_1$ may be communicatively coupled in-line with the endpoint device(s) 130. As shown, the first TDS $110_1$ may be communicatively coupled with the network 132 via an interface unit 220, which directs signaling 210 on communication network 132 to static analysis engine 140 and/or classification engine 175, given that the dynamic analysis engine 160 may be deployed with the first TDS $110_1$ (as in FIG. 1) or may be deployed in cloud computing services 138 as shown. Hence, one or more objects along with metadata in the network traffic are routed to the static analysis engine 140 via communication path 225. The suspect objects may be routed via communication path 240 to the dynamic analysis engine 160 in cloud computing services 138. Similarly, objects that are not determined to be at least "suspicious" may be returned via communication path 240 for continued routing to endpoint device(s) 130. The results of the dynamic analysis engine 160 (e.g., exploit information) may be routed via communication paths 250 and 260 for prioritization before storage within a database as analysis results 178 for subsequent use by the display generation logic 192.

Figure 3:
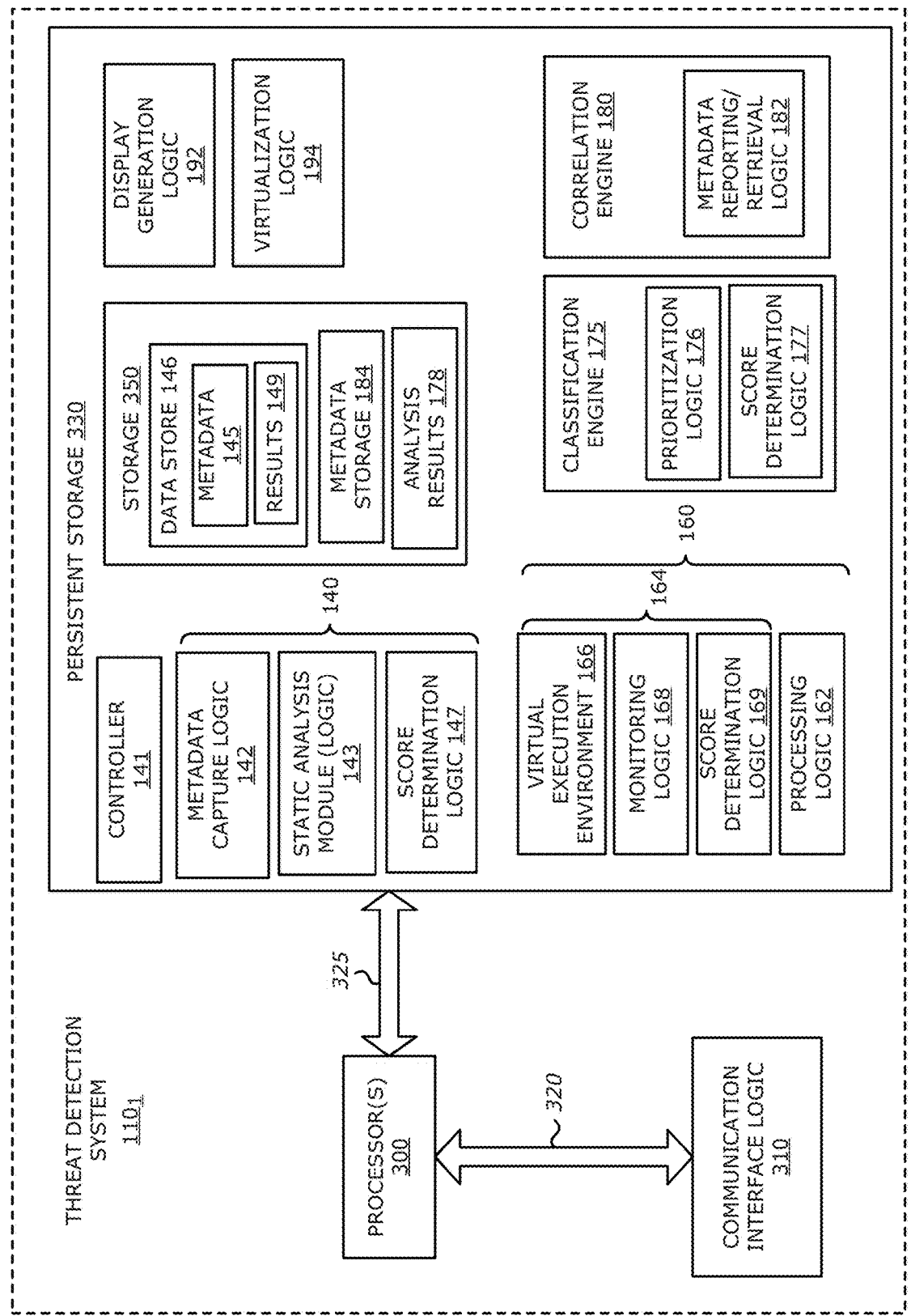
FIG. 3 is an exemplary embodiment of a logical representation of the TDS of FIG. 1 and/or FIG. 2.

Referring now to FIG. 3, an exemplary embodiment of a logical representation of the first TDS $110_1$ is shown. The first TDS $110_1$ includes one or more processors 300 that are coupled to communication interface logic 310 via a first transmission medium 320. Communication interface logic 310 enables communications with other TDS $110_2$-$110_3$ and management system 120 of FIG. 1. According to one embodiment of the disclosure, communication interface logic 310 may be implemented as a physical interface including one or more ports for wired connectors. Additionally, or in the alternative, communication interface logic 310 may be implemented with one or more radio units for supporting wireless communications with other electronic devices.

Processor(s) 300 is further coupled to persistent storage 330 via transmission medium 325. According to one embodiment of the disclosure, persistent storage 330 may include (a) static analysis engine 140, including controller 141, static analysis logic 143 and/or score determination logic 145; (b) the dynamic analysis engine 160 that includes the processing logic 162 and the virtual execution logic 164 (e.g., the virtual execution environment 166, the monitoring logic 168 and/or an optional score determination logic 169); (c) classification engine 175 including prioritization logic 176, score determination logic 177 and analysis results 178; (d) correlation engine 180 including metadata reporting/retrieval logic 182; (e) the UI rendering subsystem 190 including display generation logic 192 and/or virtualization logic 194; and (f) data stores 142, 184 and 170. Of course, when implemented as hardware, one or more of these logic units could be implemented separately from each other.

IV. Display Screens of Detected Malware

Figure 4:
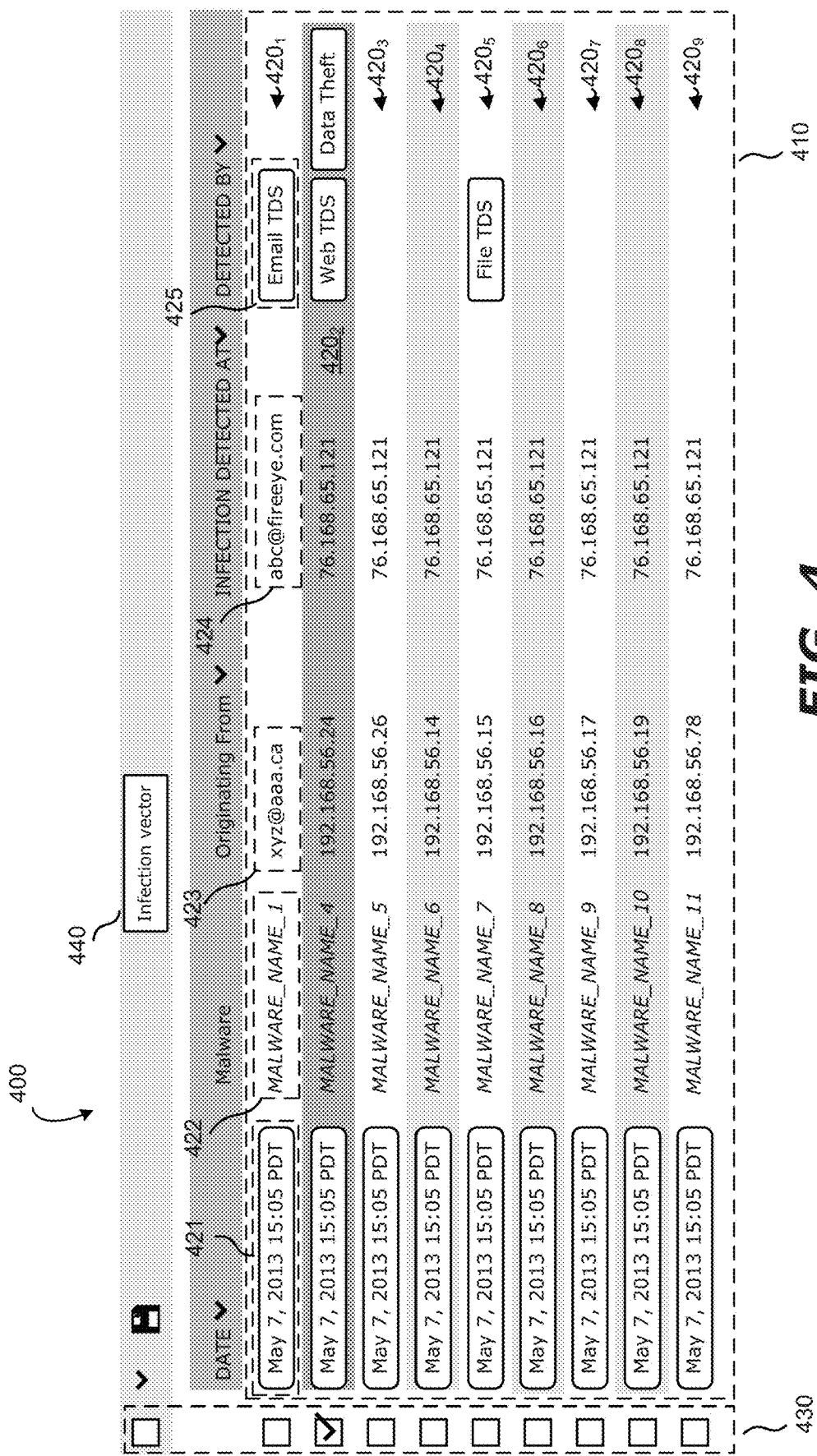
FIG. 4 is an exemplary embodiment of a malware detection screen that lists potential malware attacks detected by one or more of the TDSes deployed with the network.

Referring now to FIG. 4, an exemplary embodiment of a malware detection screen that lists potential malware attacks detected by one or more of the TDSes deployed with the network is shown. Herein, rendered by the UI rendering subsystem 190, the display screen 400 features a plurality of display areas 410 and 430 that illustrate information directed to exploits uncovered over a selected time period by the one or more TDSes $110_{1-3}$ and/or management system 120.

According to one embodiment of the disclosure, a first area 410 displays a plurality of entries $420_1$-$420_R$ (R≥1, R=9 for this embodiment) that provides information directed to detected malware infections. As shown, each row of entries (e.g., row $420_1$) rendered by the UI rendering subsystem 190 features a plurality of fields, including one or more of the following: (1) a date of the detection 421; (2) a malware name 422; (3) a point from which the detected malware infection originated 423 (e.g., device name, MAC address, IP address, etc.); (4) a point at which malware infection was detected 424 (e.g., an email address, an IP address, a MAC address, etc.); and/or (5) the one or more portions of the TDS $110_1$ by which malware infection was detected (e.g., email TDS, web TDS, file TDS, mobile TDS).

A second area 430 may be configured to allow selection of one or more detected malware infection for viewing on a visual representation (e.g., a static or dynamic picture or a video representation). In one embodiment, when a detected malware infection has been selected, the row may appear highlighted as is seen in FIG. 4. The button 440 labeled "Infection vector" enables viewing of the visual representation of the selected entries. For example, based on the exemplary embodiment of FIG. 4 in which entry $420_2$ is selected, activation of the button 440 labeled "Infection vector" would subsequently present a visual representation of the detected malware infections represented in entry $420_1$.

The visual representation may be comprised of, among other things, a static picture of a map providing a visual illustration of the one or more hops from its point of origin to the point at which it was detected. Metadata associated with hops outside an enterprise network (e.g., enterprise network 503 of FIG. 5) may be retrieved from servers external to the enterprise network while metadata associated with the hops within the enterprise network may be accessible from a selected TDS. In other embodiments, the visual representation may also include hops traveled from the point of detection (e.g., to endpoint devices and/or to external callback locations). Furthermore, the visual representation may be a dynamic picture in which a portion of the visual representation becomes animated upon selection (e.g., expanding to illustrate endpoint devices to which the detected malware infection has traveled). The visual representation may also be portrayed as a video which details one or more hops the detected malware infection has traveled from its point of origin. Additionally, the visual representation may be a nested interactive display screen.

Figure 5:
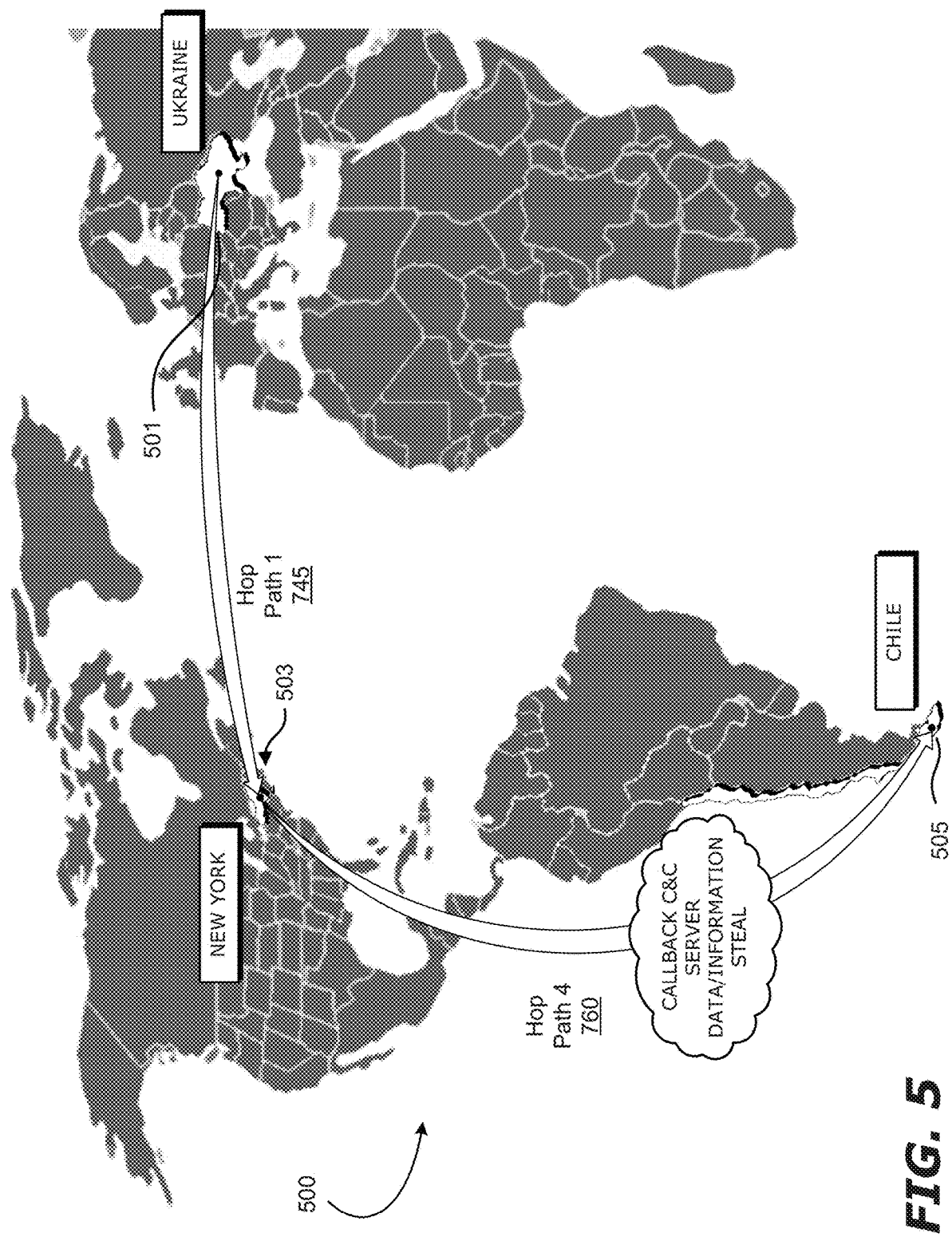
FIG. 5 is an exemplary embodiment of a first nested interactive display screen for display of an infection vector associated with malware and the propagation of malware.

Referring now to FIG. 5, an exemplary embodiment of a first nested interactive display screen 500 for display of an infection vector associated with malware and the propagation of malware is shown. Herein, rendered by the UI rendering subsystem 190, display screen 500 features an illustration of the plurality of hops taken by a detected malware infection from its point of origin 501 to an entry point into an enterprise network 503 to a location of a callback 505 overlaid on a portion of a world map.

In the embodiment shown in FIG. 5, the detected malware infection is seen to originate in the Ukraine (e.g., the point of origin 501) travel along hop path 1 745 to New York State (e.g., an entry point into the enterprise network 503) and subsequently along hop path 4 760 to Chile (e.g., the location of a callback 505). The callback resulting in hop path 4 is seen as "Callback C&C Server Data/Information Steal" 760. In some embodiments, a user viewing the display screen 500 (e.g., a network analyst employed by the enterprise infected by the malware and/or infection) may select (e.g., click with a pointer or touch via a touch screen) an item on the display screen 500 to view further information on one or more nested interactive display screens as shown in FIGS. 6A-6C described below.

Figure 6A:
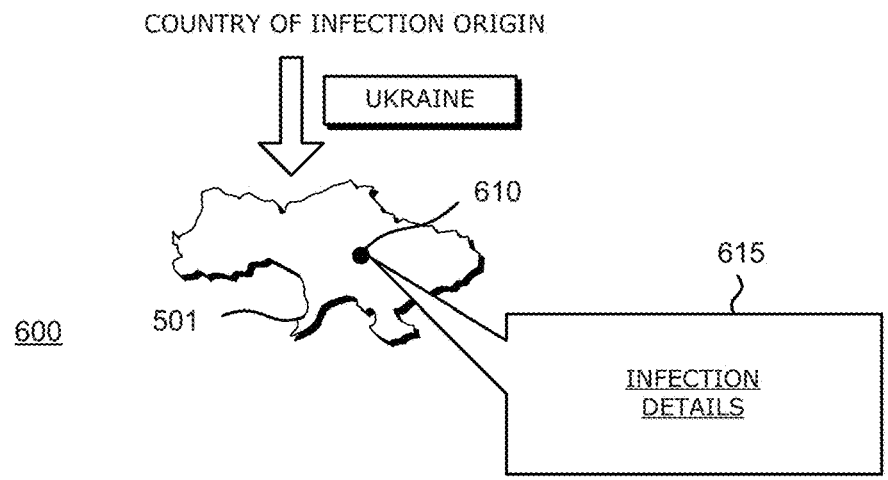
FIG. 6A is an exemplary embodiment of a second nested interactive display screen for display of a country associated with an origin for the detected malware and/or particulars associated with the origin for the detected malware.

Referring to FIG. 6A, an exemplary embodiment of a second nested interactive display screen 600 for display of a country associated with an origin for the detected malware and/or particulars associated with the origin for the detected malware of FIG. 5 is shown. By selecting the point of origin 501 in FIG. 5 (e.g., Ukraine), a viewer may obtain a more focused view of the country associated with an origin for the detected malware and/or particulars associated with the origin for the detected malware. As seen in FIG. 6A, a pinpoint 610 appears on a map of Ukraine, the country associated with an origin of the detected malware. The view represented by FIG. 6A allows the viewer to obtain a visual understanding of the geographic location of the origin of the malware within the country associated with the origin for the detected malware. In one embodiment, a viewer may select the pinpoint 610 or a pop-up display 615 to view infection details as described below and illustrated in FIG. 8A.

Figure 6B:
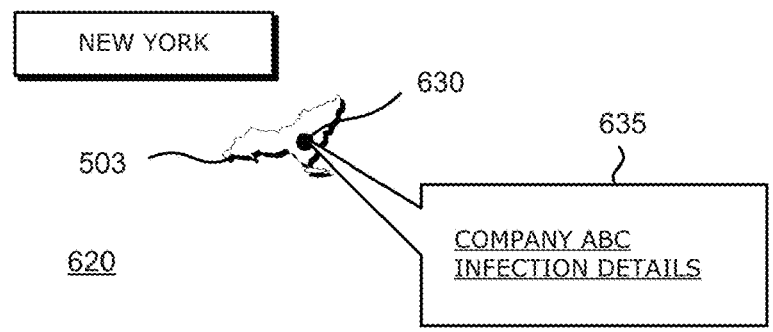
FIG. 6B is an exemplary embodiment of a third nested interactive display screen for display of an area of an entry point of the detected malware in the enterprise network.

Referring to FIG. 6B, an exemplary embodiment of a third nested interactive display screen 620 for display of an area of an entry point of the detected malware in the enterprise network of FIG. 5 is shown. By selecting the entry 503 in FIG. 5 (e.g., New York State), a viewer may obtain a more focused view of the area of an entry point of the detected malware in the enterprise network. As seen in FIG. 6B, a pinpoint 630 appears on a map of New York State, the area of an entry point of the detected malware. The view represented by FIG. 6B allows the viewer to obtain a visual understanding of the geographic location of the area of an entry point of the detected malware. In one embodiment, a viewer may select the pinpoint 630 or a pop-up display 635 to view infection details of the enterprise network at the entry point as described below and illustrated in FIG. 8B.

Figure 6C:
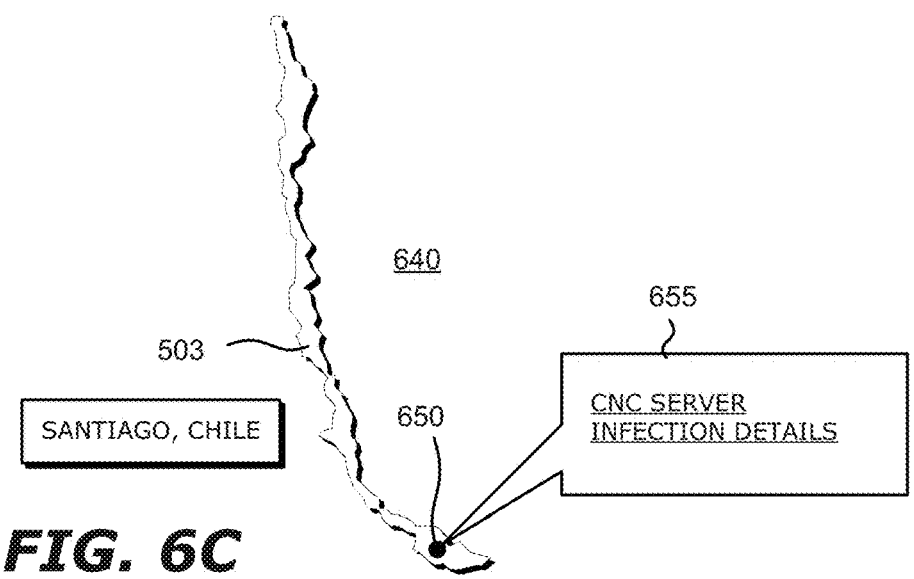
FIG. 6C is an exemplary embodiment of another nested interactive display screen for display of an area of the Command and Control (CnC) server based on a detected malicious callback attack in the enterprise network.

Referring to FIG. 6C, an exemplary embodiment of another nested interactive display screen 640 for display of an area associated with a targeted destination 505 of a command and control (CnC) server that illicitly extracted information from the enterprise network is shown. By selecting the entry 505 in FIG. 5 (e.g., Santiago, Chile), a viewer may obtain a more focused view of the area of a destination point for information obtained by the detected malware in the enterprise network. As seen in FIG. 6C, a pinpoint 650 appears on a city Santiago in the country of Chile. The view represented by FIG. 6C allows the viewer to select the pinpoint 650 or a pop-up display 655 to view infection details associated with the targeted destination, which includes some or all of the information as set forth in FIG. 8A along with filename, document name, size, date created and other metadata associated with the extracted file or document.

Figure 7:
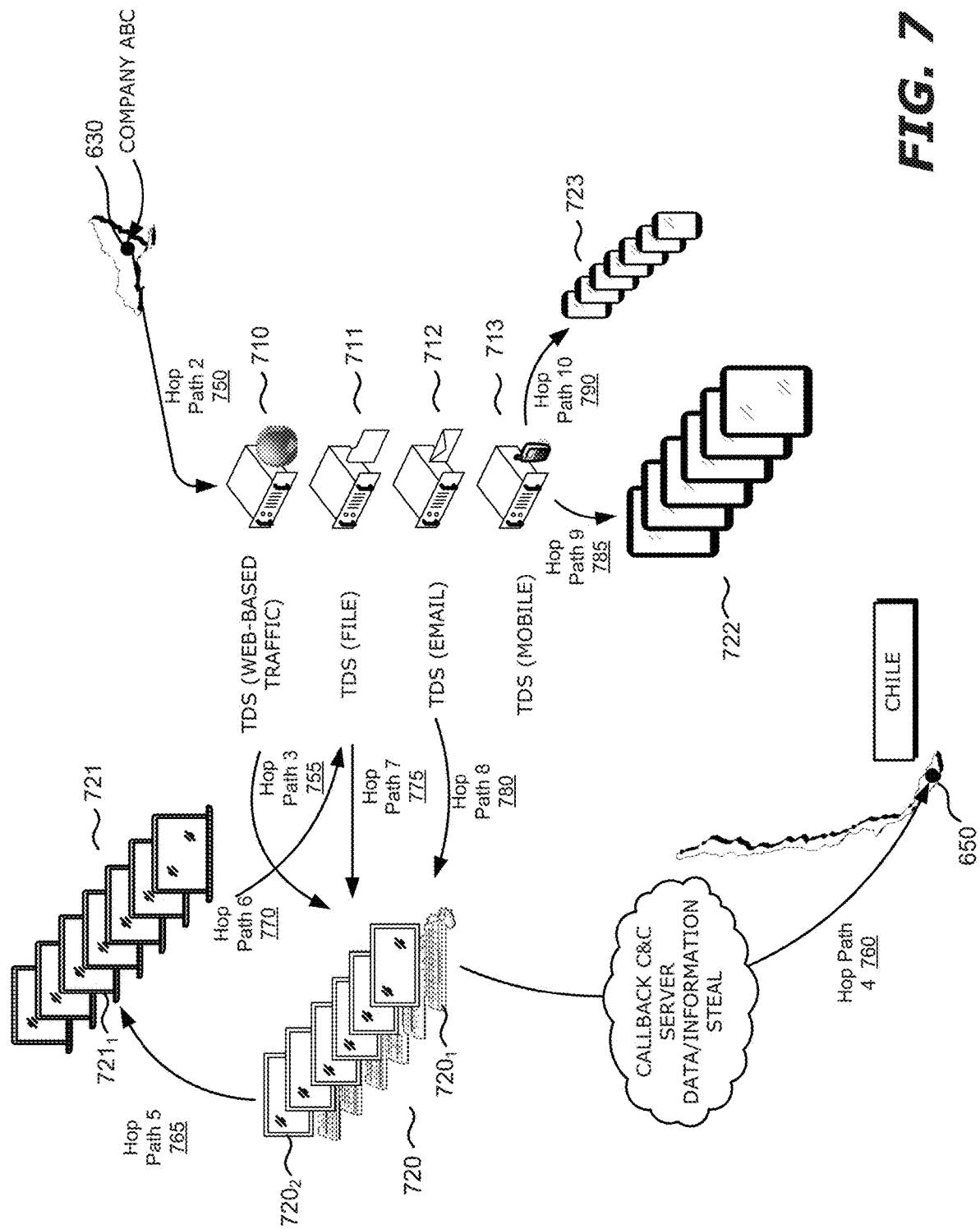
FIG. 7 is an exemplary embodiment of a fourth nested interactive display screen for display of one or more TDSes deployed within the enterprise network and the propagation paths of the detected malware.

Referring to FIG. 7, an exemplary embodiment of a fourth nested interactive display screen for display of one or more TDSes deployed within the enterprise network and the propagation paths of the detected malware of FIGS. 5-7 is shown. Pinpoint 630 represents an entry point of the detected malware in the enterprise network of Company ABC. The detected malware may spread laterally throughout the enterprise network. In FIG. 7, the malware travels via hop path 2 750 to TDS (web-based traffic) 710. The TDS (web-based traffic) 710 may be positioned as a tap and only obtain a copy of the web-based traffic containing the malware while permitting the web-based traffic to spread laterally to a one or more endpoint devices (e.g., a plurality of enterprise laptops) 720 via hop path 3 755.

From the endpoint devices 720, a callback may be made to an external server at pinpoint 650 (e.g., in Santiago, Chile) via hop path 4 760. The callback may be due to, for example, an automatic execution of executable code (e.g., a portion of the malware) that may open a communication port between one of the endpoint devices 720 (e.g., endpoint device $720_1$) and the server in Santiago, Chile and/or send data from the endpoint device $720_1$ to the server in Santiago, Chile. Alternatively, the callback may enable the server to upload code (such as more malware) onto the endpoint device $720_1$. The metadata associated with this information may be obtained from the endpoint device $720_1$ responsible for the callback or from web-based traffic being monitored by the TDS 710 for example.

The malware may also spread laterally through peer-to-peer communication within the enterprise network, where metadata of the lateral infection may be provided by an infected endpoint device $720_2$ or an endpoint device $721_1$ being infected. For example, a document may be transferred (through email, Bluetooth® and/or a flash drive) via hop path 5 765 from the endpoint device $720_2$ to one or more endpoint devices (e.g., enterprise laptop $721_1$). The malware may travel to TDS (file) 711 via hop path 6 770 from the endpoint device $721_1$ and subsequently from TDS (file) 711 to one or more endpoint devices 720 via hop path 7 775. Alternatively, the malware may travel to one or more endpoint devices 720 from TDS (email) 712 via hop path 8 780. Furthermore, the TDS (mobile) 713 may spread the malware to one or more endpoint devices (e.g., tablets) 722 or one or more endpoint devices (e.g., mobile phones) 723 along hop path 9 785 and hop path 10 790, respectively.

It is contemplated that metadata associated with the propagation of the malware is stored within correlation engines of TDS (web-based traffic) 710, TDS (file) 711, TDS (email) 712 and TDS (mobile) 713, where the metadata may be exchanged between these correlation engines. As a result, independent of which TDS 710-713 is queried by the network analyst, each TDS 710-713 has an ability to provide one or more geographical displays that illustrate the infection vector and the propagation of the malware within the enterprise network. Combined with access to traffic origination geo-servers or third party servers monitoring traffic through public networks outside the enterprise network and metadata gathered from endpoint devices involved in these communications, each TDS 710-713 may provide the entire propagation path for the malware. Of course, it is contemplated that the TDSes 710-713 may be organized in a master-slave orientation in which a master TDS aggregates the collective metadata and handles the holistic geographical displays.

Figure 8A:
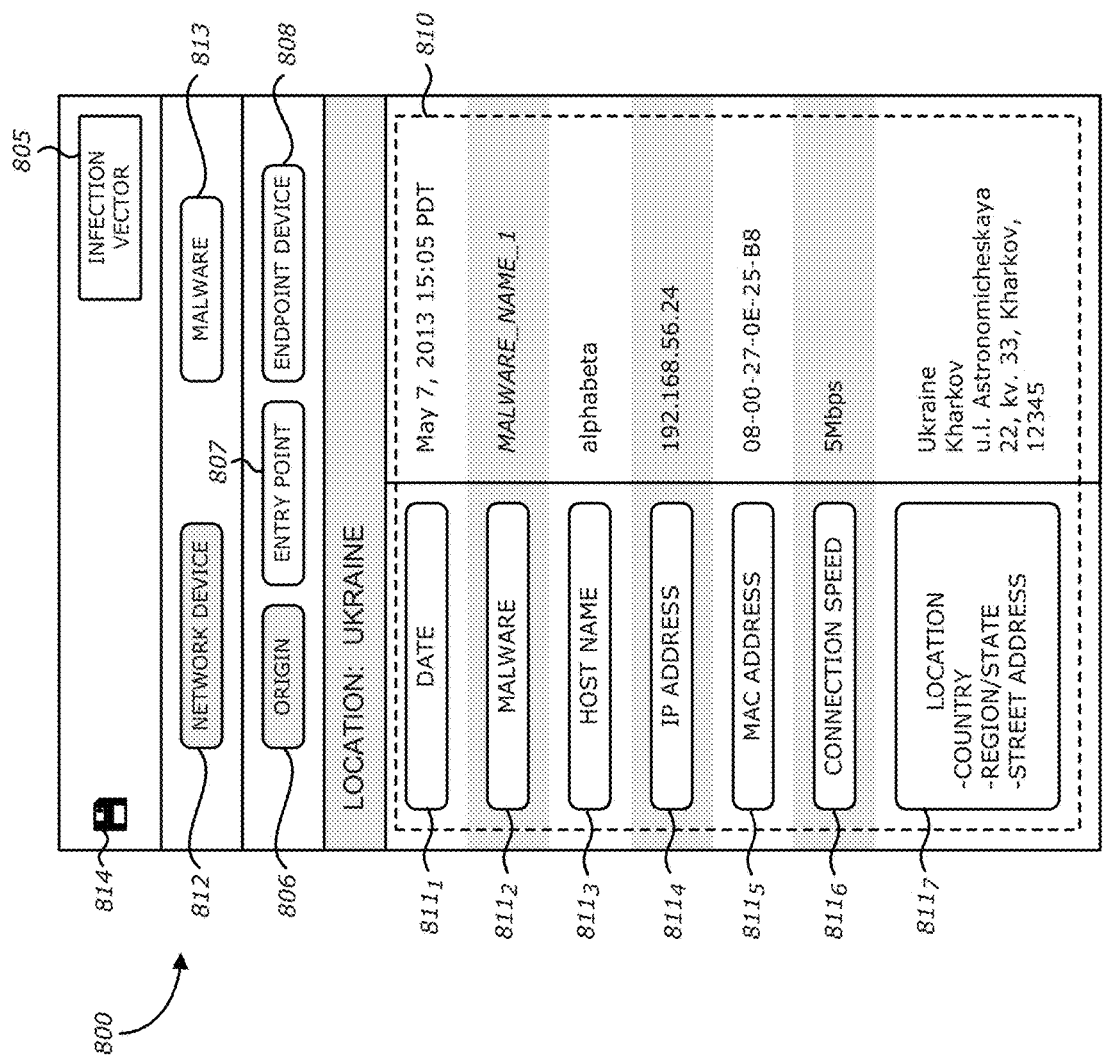
FIGS. 8A-8E are exemplary embodiments of display screens listing parameters of which some or all are displayable upon selection of the origin of the detected malware, the entry point area, TDSes and endpoint devices of the enterprise network.

Referring to FIGS. 8A-8E, exemplary embodiments of display screens listing parameters of which some or all are displayable upon selection of the origin of the detected malware, the entry point area and endpoint devices of the enterprise network are shown. Referring to FIG. 8A, an exemplary embodiment of a display screen listing parameters of the origin of the detected malware is shown. Herein, rendered by the UI rendering subsystem 190, display screen 800 features a plurality of buttons 805-808 and a display area 810, where buttons 806 and 812 are highlighted to identify the origin display. According to one embodiment of the disclosure, the display area 810 features a plurality of entries $811_1$-$811_Q$ (Q≥1, Q=7 for this embodiment) that provide information directed to the selected hop (e.g., origin) in the propagation of the malware. As shown in FIG. 8A, the display area 810 features entries such as, but not limited or restricted to: (1) a date of the original transmission of the malware $811_1$; (2) a malware name $811_2$; (3) the host name of the originating network device $811_3$; (4) the IP address of the originating network device $811_4$; (5) the MAC address of the originating network device $811_5$; (6) the connection speed of the originating network device $811_6$ (e.g., dial-up, broadband, T1/T2, etc.); and/or (7) the geographic location of the originating network device $811_7$ (e.g., country, region/state, and/or street address).

The entry directed a connection speed of the originating network device $811_6$ may give the viewer information from which one may imply a nature of the malware attack. For instance, if the connection speed of the originating network device is a high-speed such as a T1 or T2 connection, this may allow for the inference that a government entity is behind the propagation of the malware. A slower connection speed, such as a dial-up or cable modem connection for example, may denote that the malicious attack is initiated by an individual.

Buttons 805-808 and 812-814 provide additional functionalities for the viewer. For instance, in the embodiment of FIGS. 8A-8E, button 814 appears as an icon of a floppy disk representing a "save" option. By selecting button 814, the viewer may save the information listed on display screen 801. In one instance, selecting button 805 labeled "Infection vector" enables the viewer to return to the nested interactive display screen of FIG. 5, and in yet another embodiment, selecting button 805 enables the viewer to return to the nested interactive display screen of FIG. 6A. Selecting one of buttons 806-808 enables a viewer to alternate between display screens listing parameters of which some or all are displayable upon selection of the origin of the detected malware, the entry point area and endpoint devices of the enterprise network. Selecting one of buttons 812 or 813 enables the viewer to see the particulars for the selected network device (e.g., at the point of origin, at the entry point, or for one or more endpoint devices) or for the detected malware respectively.

Figure 8B:
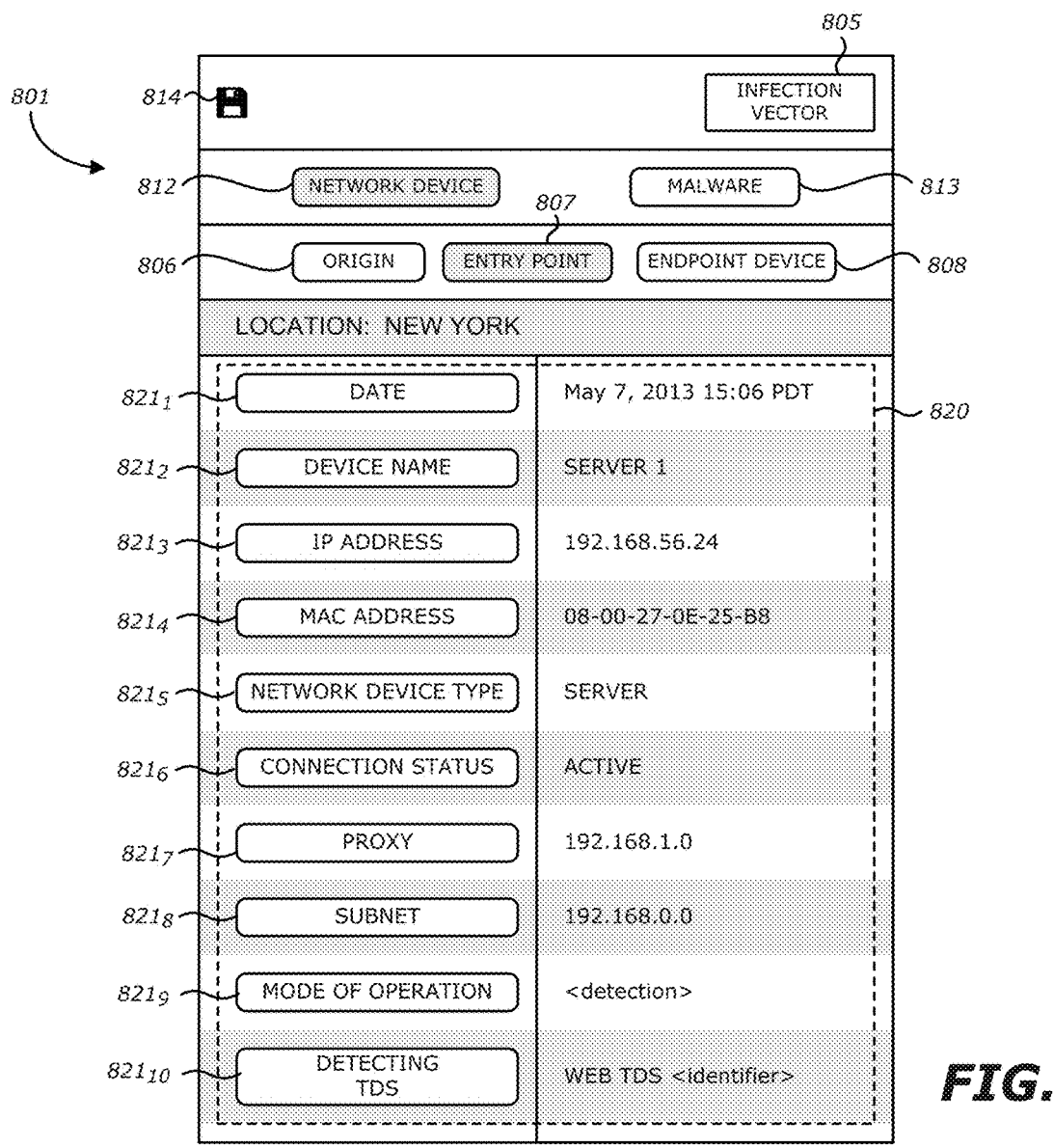

Referring to FIG. 8B, an exemplary embodiment of a display screen listing parameters of the entry point of the detected malware in the enterprise network is shown, where buttons 807 and 812 are highlighted to identify the entry point display. Herein, rendered by the UI rendering subsystem 190, display screen 801 features a plurality of buttons 805-808 and 812-814, and a display area 820. According to one embodiment of the disclosure, the display area 820 features a plurality of entries $821_1$-$821_S$ (S≥1, S=10 for this embodiment) that provide information directed to the selected hop of the propagation of the malware. As shown in FIG. 8B, the display area 820 features entries such as, but not limited or restricted to: (1) the date of the detection $821_1$; (2) the network device name $821_2$; (3) the IP address of the detecting network device $821_3$; (4) the MAC address of the detecting network device $821_4$; (5) the type of network device $821_5$; (6) the connectivity status of the detecting network device $821_6$; (7) a proxy behind which the detecting network device resides or reports to $821_7$ (e.g., reporting via X-Forwarded-For "XFF" protocol); (8) a subnet to which the detecting network belongs $821_8$; (9) the mode of operation of the detecting network device at the time of detection $821_9$ and/or (10) the portion of the TDS that detected the malware (e.g., web TDS, email TDS, file TDS, mobile TDS). Examples of other entries that may appear in display screen 801 include, but are not limited or restricted to, the size of the detecting device, other network devices to which the detecting device was connected at the time of detection and/or endpoint devices the detecting device was serving at the time of detection.

The network device type entry $821_5$ may inform the viewer of whether the detecting network device is a firewall, router, switch or other networked electronic device) or a standalone component, such as an appropriate commercially available network tap. The connectivity status entry $821_6$ may inform the viewer whether there exists current, active communications with a CnC server or other malicious server. The proxy entry $821_7$ may inform the viewer of the proxy behind which the detecting network device was operating at the time of detection (if applicable) or the proxy to which the detecting network device was reporting at the time of detection (if applicable). The subnet entry $821_8$ may inform the viewer of the subnet with which the detecting network device was associated at the time of detection (if applicable). The mode of operation entry $821_9$ may inform the viewer of whether the detecting network device was operating in a detection mode (e.g., detection and reporting findings of malicious attacks) or in prevention mode (e.g., detection and remediation of malicious attacks) at the time of detection. If the detecting network device was in prevention mode and therefore actively preventing malware from entering and spreading throughout the enterprise network, but subsequently allowed the malware to infect one or more electronic devices connected to the enterprise network, an update is likely needed to increase the effectiveness of the TDS (e.g., a software patch identifying the malware that is currently infecting one or more electronic devices connected to the enterprise network).

Figure 8C:
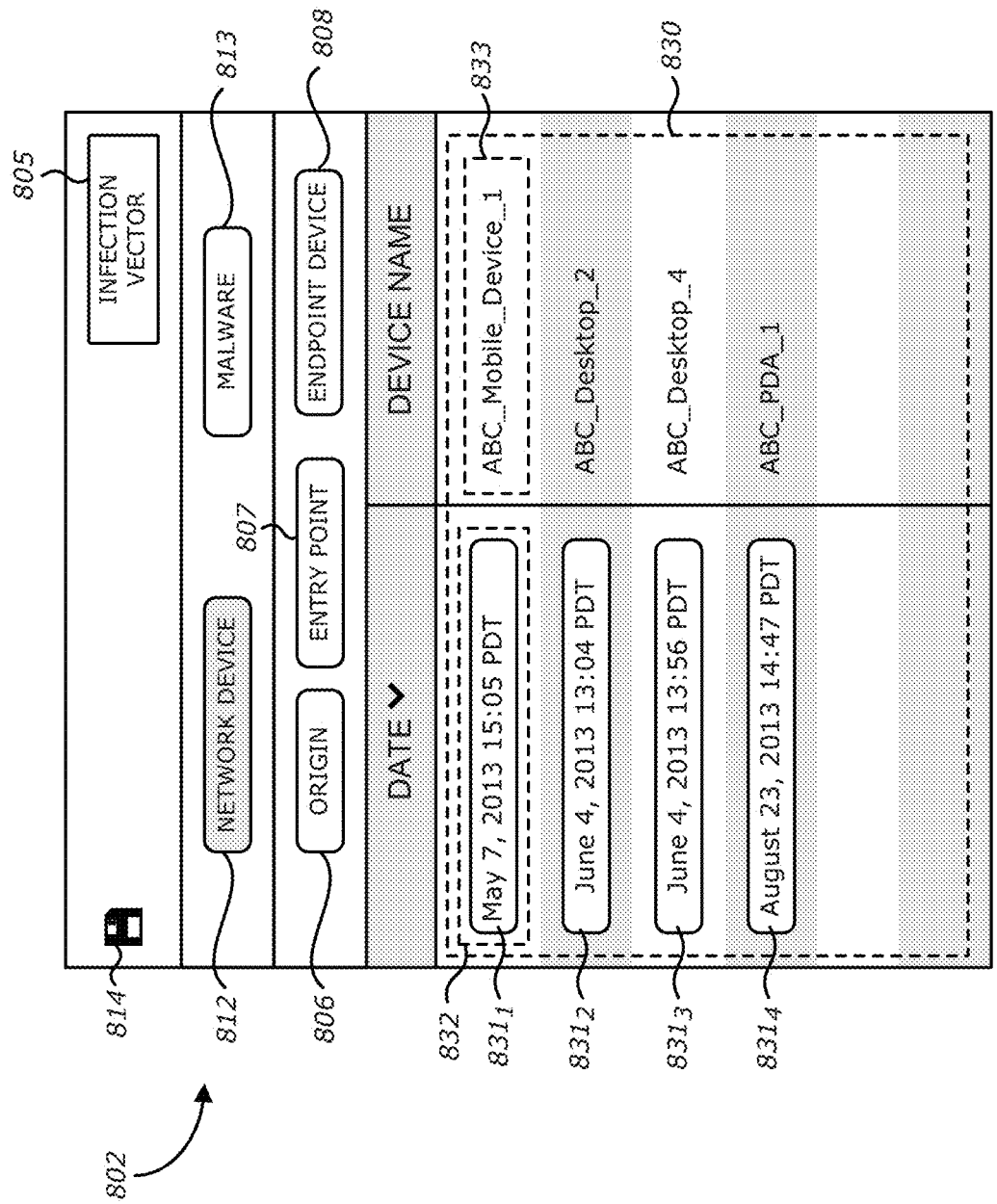

Referring to FIG. 8C, an exemplary embodiment of a malware detection screen that lists one or more endpoint devices infected by the malware attack illustrated in FIG. 5 is shown. Herein, rendered by the UI rendering subsystem 190, the display screen 802 features a plurality of buttons 805-808 and 812-814, and a display area 830.

According to one embodiment of the disclosure, the display area 830 displays a plurality of entries $831_1$-$831_U$ (U≥1, U=4 for this embodiment) that provide information directed to detected malware infections. As shown, each row of entries (e.g., $831_1$) represents a date 832 and a device name 833 of an infected endpoint device. The date 832 represents the date on which the malware was received by the endpoint device and the device name 833 represents a unique name of the endpoint device (e.g., MAC address or a name, if applicable). In some embodiments, the selection of an endpoint device within the display screen 830 (e.g., "ABC_Mobile_Device_1" 833) may enable a viewer to see further details regarding the selected endpoint device.

Figure 8D:
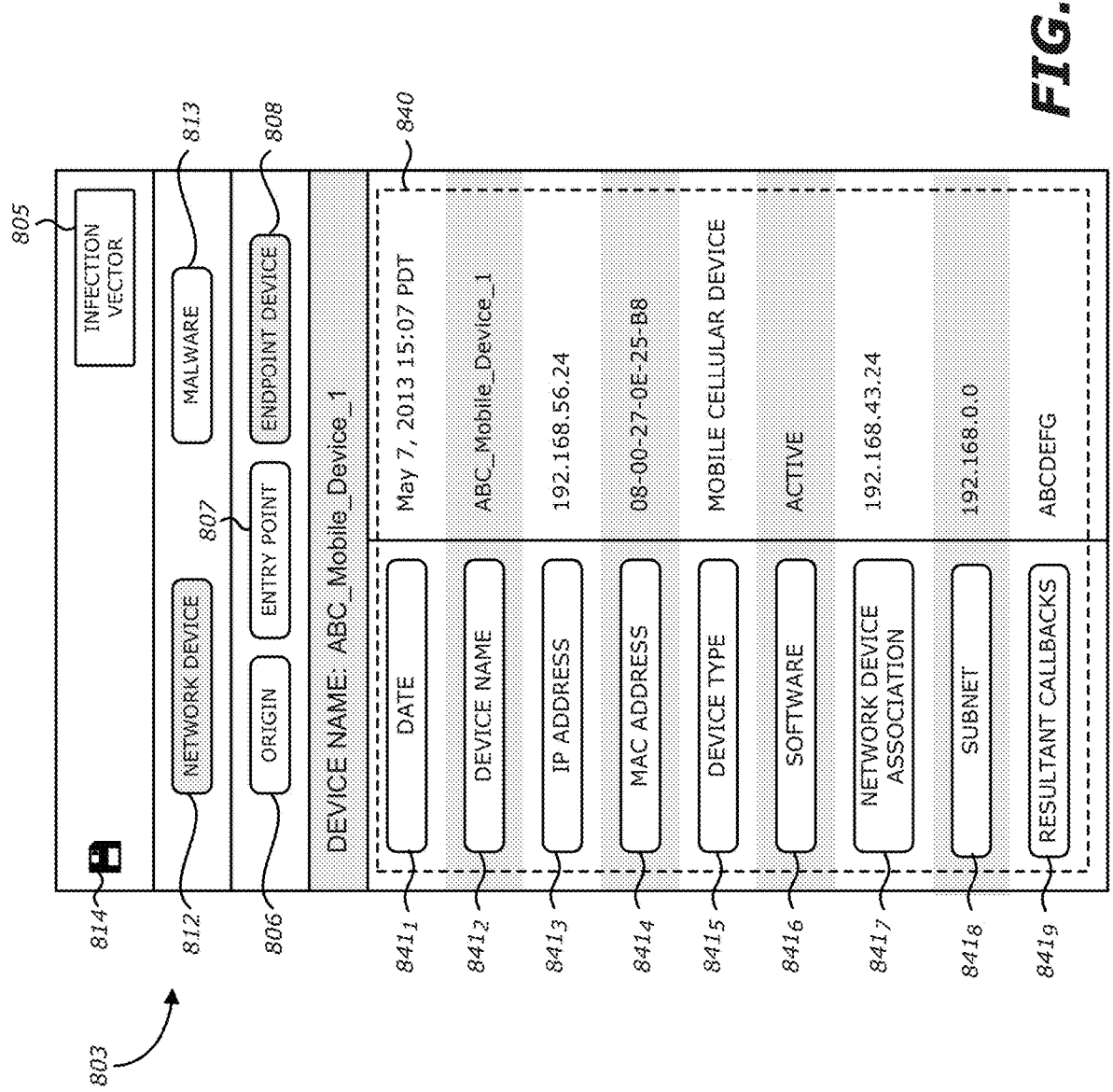

Referring to FIG. 8D, an exemplary embodiment of a display screen listing parameters of a selected, infected endpoint device is shown, where buttons 808 and 812 are highlighted to identify the endpoint device display. Herein, rendered by the UI rendering subsystem 190, display screen 803 features a plurality of buttons 805-808 and 812-814 and a display area 840. According to one embodiment of the disclosure, the display area 840 features a plurality of entries $841_1$-$841_V$ (V≥1, V=9 for this embodiment) that provide information directed to the selected hop of the propagation of the malware. As shown in FIG. 8D, the display area 840 features entries such as, but not limited or restricted to: (1) the date of the detection $841_1$; (2) the device name $841_2$; (3) the IP address of the infected endpoint device $841_3$; (4) the MAC address of the infected endpoint device $841_4$; (5) the type of endpoint device $841_5$; (6) the software version running on the infected network device $841_6$; (7) a network device association of the infected endpoint device $841_7$; (8) a subnet to which the infected endpoint device belongs $841_8$; and/or (9) any callbacks made by the infected endpoint device as a result of the malware $841_9$.

The endpoint device type entry $841_5$ may inform the viewer of whether the detecting network device is a laptop, a desktop, a mobile cellular device, a tablet, etc. Examples of a software-type entry $841_6$ may include, but are not limited or restricted to, computing operating systems such as Windows® XP, Windows® 7, Windows® 8, Mac OS® X and/or Mac OS® Maverick, and/or a mobile operating system such as Android™ JellyBean or iOS. The network device association entry $841_7$ may inform the viewer of to which network device the mobile device was connected at the time of infection. The subnet entry $841_8$ may inform the viewer of the subnet with which the infected endpoint device was associated at the time of infection (if applicable). The resultant callbacks entry $841_9$ may inform the viewer of whether any callbacks have been made to external locations as a result of the malware infecting the endpoint device.

Figure 8E:
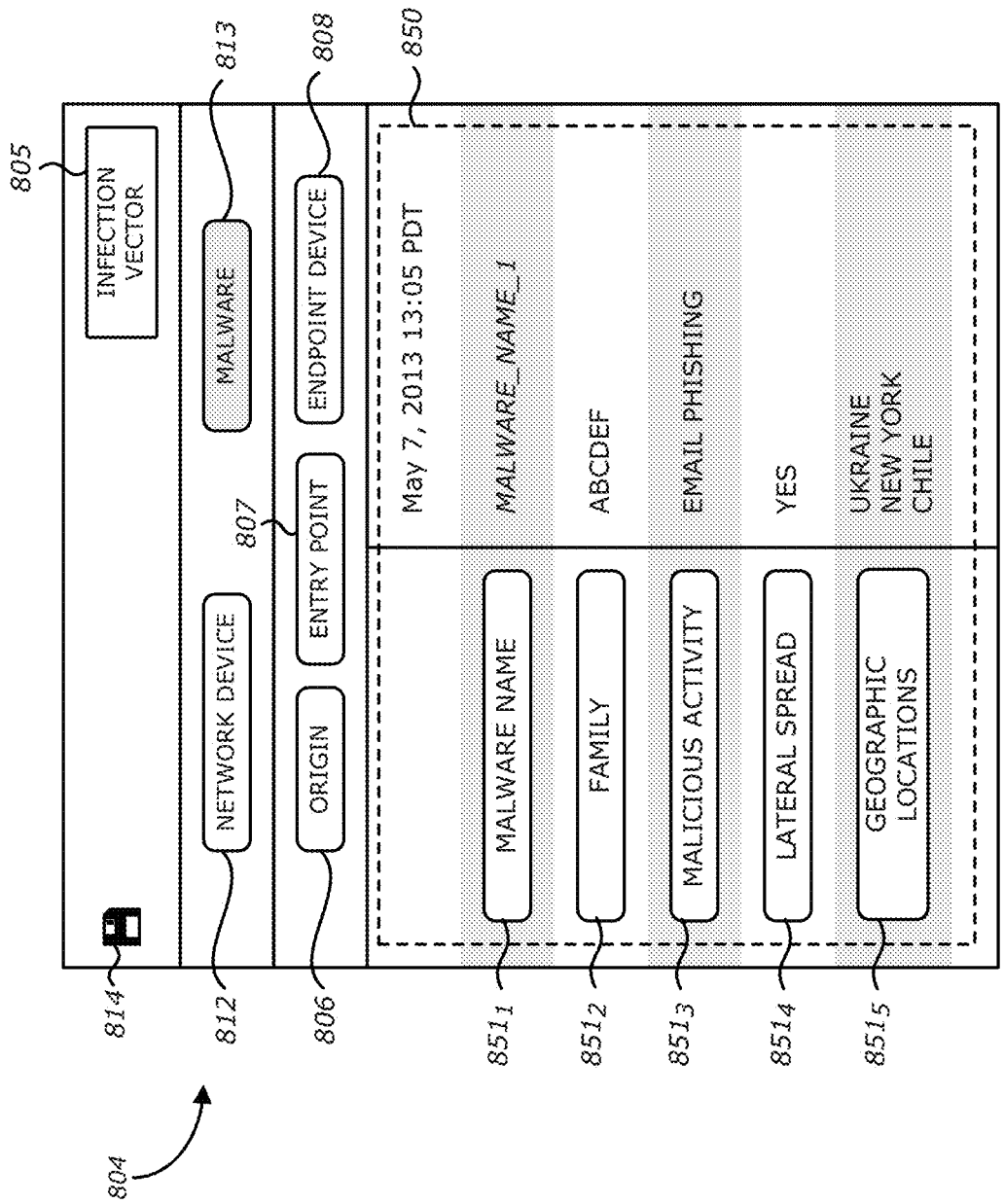

Referring to FIG. 8E, an exemplary embodiment of a display screen listing parameters of the detected malware in the enterprise network is shown. Herein, rendered by the UI rendering subsystem 190, display screen 804 features a plurality of buttons 805-808 and 812-814, and a display area 850. According to one embodiment of the disclosure, the display area 850 features a plurality of entries $851_1$-$851_W$ (W≥1, W=5 for this embodiment) that provide information directed to the detected malware. As shown in FIG. 8E, the display area 850 features entries such as, but not limited or restricted to: (1) the name of the malware $851_1$; (2) the known family of the malware $851_2$; (3) types of malicious activity conducted such as information compromised or stolen via call-back, etc. $851_3$; (4) information that identifies whether the malware has spread laterally $851_4$; and/or (5) the geographic locations to the malware has been transmitted to/from $851_5$.

Figure 9:
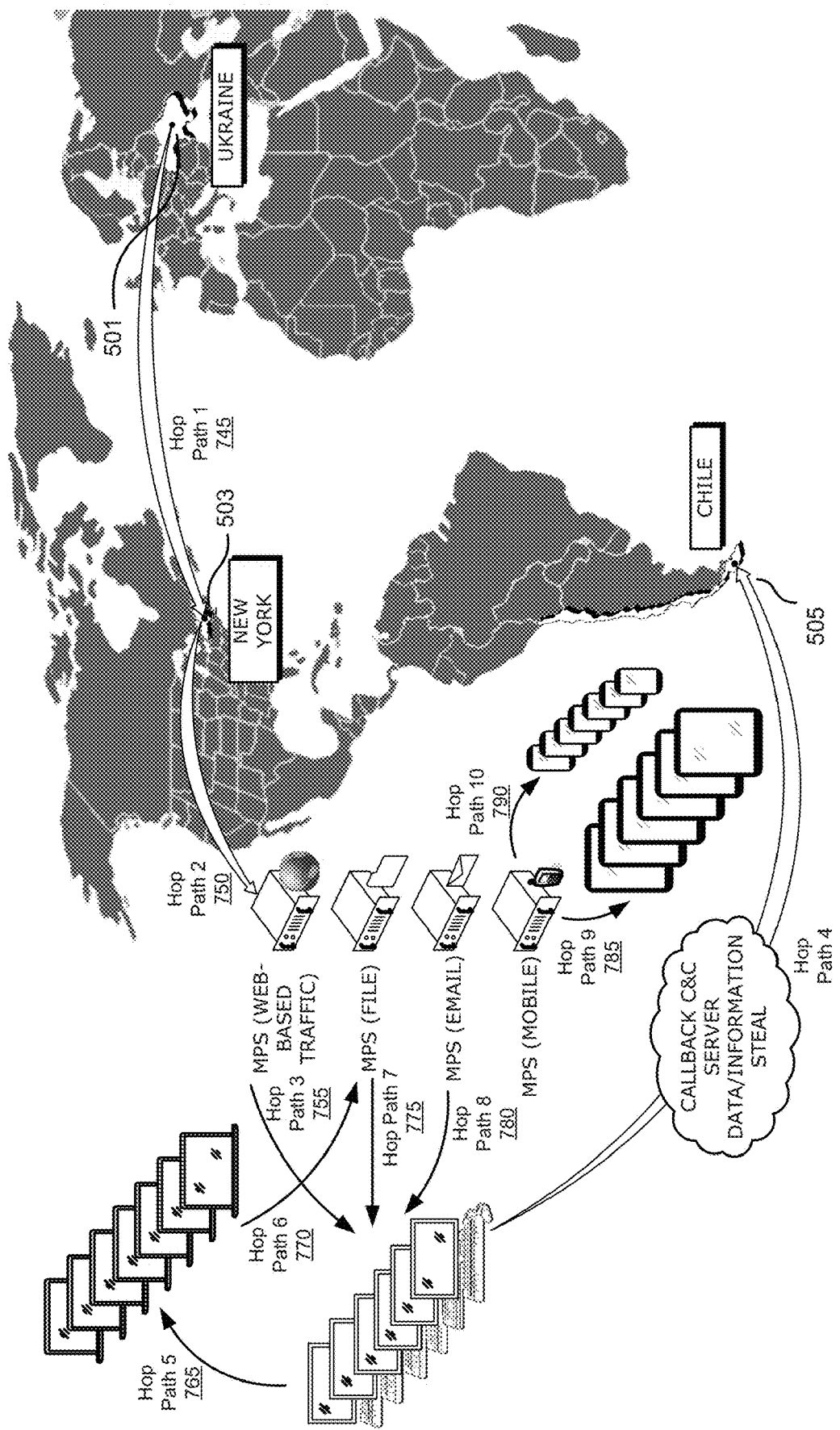
FIG. 9 is an exemplary embodiment of holistic interactive display screen for display of an infection vector associated with malware and the propagation of malware selected in on malware detection screen of FIG. 4.

Referring to FIG. 9, an exemplary embodiment of a holistic interactive display screen for display of an infection vector associated with malware and the propagation of malware selected in on malware detection screen of FIG. 4 is shown. To accomplish this, the nested interactive display screen of FIG. 7 was overlaid on a portion of a world map. FIG. 9 illustrates the propagation of the malware from the country associated with an origin for the detected malware and/or particulars associated with the origin for the detected malware to an area of an entry point of the detected malware in the enterprise network. FIG. 9 further illustrates the lateral spread of the malware throughout the enterprise network and, based on the infection of one or more endpoint devices connected to the enterprise network, a resultant call-back to an external server.

In the foregoing description, the invention is described with reference to specific exemplary embodiments thereof. It will, however, be evident that various modifications and changes may be made thereto without departing from the broader spirit and scope of the invention as set forth in the appended claims. For instance, the gathering and storage of metadata may be conducted by a dedicated network device other than a TDS, where the dedicated network device communicates with the TDSes and endpoint devices to acquire metadata. The functionality of the dedicated network device would be consistent with the metadata capture logic, the correlation engine and the UI rendering subsystem 190 as described above.

What is claimed is:

1. A computerized method comprising:
   in response to an event, gathering information associated with a malicious attack within an enterprise network, the information comprises at least a geographic location associated with each of a first plurality of network devices potentially infected by malware used in the malicious attack;
   generating, by virtualization logic being executed by one or more hardware processors, a first interactive display of a visual propagation path of the malware associated with the malicious attack, the first interactive display comprises a first plurality of display items that provide information as to at least an entry point of the malware into an enterprise network, each of the first plurality of display items is selectable; and
   generating, by the virtualization logic, a second interactive display that comprises (a) a second plurality of display items representing a second plurality of network devices being part of the enterprise network and (b) a plurality of hop paths that illustrate an ordered propagation of the malware in accordance with peer-to-peer communications between the second plurality of network devices within the enterprise network, one or more display items of the first plurality of display items being part of the second plurality of display items.

2. The method of claim 1, wherein the gathering of the information associated with the malicious attack further comprises gathering metadata associated with communications with an infected network device of the second plurality of network devices, the infected network device propagating malware through the enterprise network, the metadata includes a host name of the network device.

3. The method of claim 2, wherein the metadata associated with communications with the infected network device further includes a sequence of software images identifying changes in operational state of the infected network device.

4. The method of claim 2, wherein the gathering of the information associated with the malicious attack further comprises gathering information associated with communications with a source network device for the malware associated with the malicious attack being one of the second plurality of display items, the metadata further includes a host name of the source network device.

5. The method of claim 4, wherein the information associated with communications with the source network device comprises metadata that includes at least one of connection type or speed of the connection.

6. The method of claim 1, wherein the second plurality of display items represets a first threat detection system that monitors web traffic over the enterprise network and a second threat detection system that monitors electronic mail communications over the enterprise network.

7. The method of claim 1, wherein first plurality of display items further represents an origin of the malware associated with the malicious attack and a selection of a display item of the first plurality of display items directed to the origin of the malware generates one or more display screen listing parameters that comprise at least one of (1) a date of transmission of the malware or (2) a connection speed of an originating network device being the origin of the malware.

8. The method of claim 7, wherein selection of the display item of the first plurality of display items directed to the origin of the malware of the interactive display generates one or more display screen listing parameters further comprises (3) one or more identifiers of the originating network device and (4) a geographic location including at least a city and country of the originating network device.

9. The method of claim 1, wherein selection of a display item of the second plurality of display items directed to the entry point of the malware in the interactive display generates a display screen listing parameters that comprises at least three of (1) a date of the detection; (2) one or more identifiers of a detecting network device associated with an entry point; (3) a device type of the detecting network device; (4) connectivity status of the detecting network device; (5) a mode of operation of the detecting network device at the time of detection.

10. The method of claim 1, wherein selection of a display item of the second plurality of display items directed to the targeted destination of the malware in the interactive display generates a display screen listing parameters that comprises at least three of (1) a date of the detection; (2) an identifier of the destination device; (3) a device type of the destination device; (4) a version number of software running on the destination device; (5) a listing of any callbacks made by the destination device.

11. The method of claim 1, wherein the a plurality of hop paths illustrate a lateral spread of the malware between at least two of the plurality of network devices represented by the second plurality of display items within the enterprise network.

12. The method of claim 1, wherein the a plurality of hop paths further include at least one hop path to illustrate propagation of the malware between a network device of the first plurality of network devices that are part of the enterprise network and a network device represented by one of the plurality of display items that is different than any of the first plurality of network devices associated with the enterprise network.

13. The method of claim 1, wherein the a plurality of hop paths, illustrating the ordered propagation of the malware between the second plurality of network devices, are generated by the virtualization logic based on time of receipt of network traffic including the malware by each of the second plurality of network devices.

14. The method of claim 13, wherein the virtualization logic, being part of a threat detection system, gathering metadata from the second plurality of network devices including the times of receipt of the network traffic including the malware by each of the second plurality of network devices and illustrating the ordered propagation of the malware between the second plurality of network devices by the threat detection system based on the metadata.

15. A computerized method comprising:
aggregating metadata associated with signaling propagating through an enterprise network, the enterprise network including a first plurality of network devices;
generating, by virtualization logic executed by one or more hardware processors, a first interactive display of a propagation of malware from an origin separate from the enterprise network, the first interactive display includes a first plurality of display items that comprise (i) a first display item of the first plurality of display items associated with an origin of the malware and (ii) a second display item of the first plurality of display items associated with an entry point into the enterprise network; and
generating, by the virtualization logic, a second interactive display of the propagation of the malware detected within the enterprise network, the second interactive display includes a second plurality of display items representing the first plurality of network devices being part of the enterprise network and display items associated with a plurality of hop paths that illustrate an ordered propagation of the malware based on time of receipt of information including the malware in accordance with peer-to-peer communications between two or more of the second plurality of display items corresponding to two or more network devices within the enterprise network.

16. The method of claim 15, wherein the aggregating of the metadata comprises aggregating in a chronological sequence the propagation of the malware within the enterprise network.

17. The method of claim 16, wherein the metadata being further used to identify a point of entry of the malware within the enterprise network.

18. A system comprising:
a memory;
a correlation engine stored in the memory and, upon execution, to aggregate metadata associated with messages propagating through an enterprise network including a plurality of network devices; and
a virtualization logic stored in the memory and in communication with the correlation engine, the virtualization logic, upon execution, to generate one or more interactive displays including a first plurality of display items that illustrate a visual propagation path of malware, the virtualization logic to further generate (i) a first interactive display screen that is generated to display a first display item of the plurality of display items associated with an origin of the malware and (ii) a second interactive display screen that is generated to display at least a second plurality of display items that represent the second plurality of network devices within the enterprise network to illustrate the visual propagation path of the malware along a plurality of hop paths that illustrate an ordered propagation of the malware in accordance with peer-to-peer communications between network devices within the enterprise network based on time of receipt of information including the malware, one or more display items of the first plurality of display items being part of the second plurality of display items.

19. The system of claim 18, wherein the virtualization logic fetches the aggregated metadata associated with one or more messages propagating through the enterprise network in response to an event.

20. The system of claim 19, wherein the fetching of the aggregated metadata is initiated by the event being a selection of a potential malware attack detected by a threat detection system and information associated with the potential malware attack being displayed on a display device that is part of the system.

21. The system of claim 19, wherein the aggregated metadata includes metadata uncovered after processing of an object associated with network traffic under analysis by virtual execution environment.

22. The system of claim 19, wherein the aggregated metadata includes metadata uncovered after static processing of an object associated with network traffic under analysis by a static analysis engine.

23. The system of claim 19, wherein the aggregated metadata includes metadata uncovered from network traffic being monitored by the system.

24. The system of claim 19, wherein the aggregated metadata includes at least two of (i) metadata uncovered after processing of the object associated with network traffic under analysis by virtual execution environment, (ii) metadata uncovered after static processing of the object by a static analysis engine, and (iii) metadata uncovered from network traffic being monitored by the system.

25. The system of claim 19, wherein the aggregated metadata includes metadata from endpoint devices being monitored by the system.

26. The system of claim 25, wherein the aggregated metadata further includes metadata from one or more threat detection systems other than the system.

27. The method of claim 1, wherein the geographic location associated with a network device of the first plurality of network devices is determined based on at least an Internet Protocol (IP) address assigned to the network device.

* * * * *